US011895322B2

(12) United States Patent
Abe et al.

(10) Patent No.: US 11,895,322 B2
(45) Date of Patent: *Feb. 6, 2024

(54) ENCODER, DECODER, ENCODING METHOD, AND DECODING METHOD

(71) Applicant: Panasonic Intellectual Property Corporation of America, Torrance, CA (US)

(72) Inventors: Kiyofumi Abe, Osaka (JP); Takahiro Nishi, Nara (JP); Tadamasa Toma, Osaka (JP); Ryuichi Kanoh, Osaka (JP); Chong Soon Lim, Singapore (SG); Ru Ling Liao, Singapore (SG); Hai Wei Sun, Singapore (SG); Sughosh Pavan Shashidhar, Singapore (SG); Han Boon Teo, Singapore (SG); Jing Ya Li, Singapore (SG)

(73) Assignee: Panasonic Intellectual Property Corporation of America, Torrance, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/056,963

(22) Filed: Nov. 18, 2022

(65) Prior Publication Data
US 2023/0082160 A1 Mar. 16, 2023

Related U.S. Application Data

(63) Continuation of application No. 18/056,542, filed on Nov. 17, 2022, which is a continuation of application
(Continued)

(51) Int. Cl.
H04N 11/02 (2006.01)
H04N 19/52 (2014.01)
(Continued)

(52) U.S. Cl.
CPC ........... *H04N 19/52* (2014.11); *H04N 19/119* (2014.11); *H04N 19/176* (2014.11)

(58) Field of Classification Search
CPC ..................................... H04N 19/52
(Continued)

(56) References Cited

U.S. PATENT DOCUMENTS 10,404,988 B2    9/2019  Ye et al.
10,721,492 B2    7/2020  Son et al.
(Continued)

FOREIGN PATENT DOCUMENTS

JP    2012-023597 A     2/2012
JP    2013-207402 A    10/2013
WO    WO 2018173895 A1  9/2018

OTHER PUBLICATIONS

Chen et al., "Algorithm Description of Joint Exploration Test Model 7 (JEM 7)," JVET-G1001-v1, Joint Video Exploration Team (JVET) of ITU-T SG 16 WP 3 and ISO/IEC JTC 1/SC 29/WG 11, 7th Meeting, Torino, IT, Jul. 13-21, 2017, 5 pages.
(Continued)

Primary Examiner — Leron Beck
(74) Attorney, Agent, or Firm — Seed IP Law Group LLP

(57) ABSTRACT

An encoder includes circuitry and memory. Using the memory, the circuitry, in operation, selects an encoding mode from among candidates including a decoder-side motion vector refinement (DMVR) encoding mode and a partition encoding mode. When the DMVR encoding mode is selected, the circuitry: obtains a first motion vector for a first image block; derives a second motion vector from the first motion vector using motion search; and generates a prediction image for the first image block using the second motion vector. When the partition encoding mode is selected, the circuitry: determines a plurality of partitions in
(Continued)

a second image block; obtains a third motion vector for each partition; and generates a prediction image for the second image block using the third motion vector, without deriving a fourth motion vector from the third motion vector using motion search.

3 Claims, 32 Drawing Sheets

Related U.S. Application Data

No. 18/056,136, filed on Nov. 16, 2022, which is a continuation of application No. 17/323,936, filed on May 18, 2021, now Pat. No. 11,558,635, which is a continuation of application No. 16/942,601, filed on Jul. 29, 2020, now Pat. No. 11,044,491, which is a continuation of application No. PCT/JP2019/003072, filed on Jan. 30, 2019.

(60) Provisional application No. 62/623,841, filed on Jan. 30, 2018.

(51) Int. Cl.
*H04N 19/119* (2014.01)
*H04N 19/176* (2014.01)

(58) Field of Classification Search
USPC ..................................... 375/240.01–240.29
See application file for complete search history.

(56) References Cited

U.S. PATENT DOCUMENTS

| | | | |
|---|---|---|---|
| 10,904,581 B2 | 1/2021 | Lee | |
| 2008/0159387 A1 | 7/2008 | Dvir et al. | |
| 2009/0003446 A1* | 1/2009 | Wu | H04N 19/176 |
| | | | 375/E7.19 |
| 2009/0175334 A1* | 7/2009 | Ye | H04N 19/176 |
| | | | 375/E7.244 |
| 2009/0196342 A1 | 8/2009 | Divorra Escoda et al. | |
| 2009/0268823 A1* | 10/2009 | Dane | H04N 19/55 |
| | | | 382/256 |
| 2011/0103701 A1 | 5/2011 | Cheon | |
| 2011/0194613 A1 | 8/2011 | Chen et al. | |
| 2012/0147961 A1 | 6/2012 | Guo et al. | |
| 2013/0266070 A1 | 10/2013 | Sato | |
| 2013/0266074 A1 | 10/2013 | Guo et al. | |
| 2014/0003532 A1 | 1/2014 | Coban et al. | |
| 2016/0165246 A1 | 6/2016 | Nagumo et al. | |
| 2017/0006309 A1 | 1/2017 | Liu et al. | |
| 2017/0339405 A1* | 11/2017 | Wang | H04N 19/13 |
| 2018/0041769 A1* | 2/2018 | Chuang | H04N 19/176 |
| 2018/0184117 A1* | 6/2018 | Chen | H04N 19/52 |
| 2018/0192071 A1* | 7/2018 | Chuang | H04N 19/577 |
| 2018/0332298 A1* | 11/2018 | Liu | H04N 19/70 |
| 2019/0020895 A1* | 1/2019 | Liu | H04N 19/44 |
| 2019/0132606 A1* | 5/2019 | Su | H04N 19/543 |
| 2019/0230350 A1* | 7/2019 | Chen | H04N 19/139 |
| 2019/0253710 A1 | 8/2019 | Ryu et al. | |
| 2020/0036997 A1* | 1/2020 | Li | H04N 19/139 |
| 2020/0154135 A1* | 5/2020 | Lee | H04N 19/176 |

OTHER PUBLICATIONS

International Search Report and Written Opinion, dated Feb. 26, 2019, for corresponding International Application No. PCT/JP2019/003072, 9 pages.

ISO/IEC 23008-2, "Information technology—High efficiency coding and media delivery in heterogeneous environments—Part 2: High efficiency video coding," International Standard, First Edition, Dec. 1, 2013, 312 pages.

Liu et al., "CE9: Simplification of Decoder Side Motion Vector Derivation (Test 9.2.9)," Document: JVET-L0267-v1, Joint Video Experts Team (JVET) of ITU-T SG 16 WP 3 and ISO/IEC JTC 1/SC 29/WG 11, 12th Meeting, Macao, China, Oct. 3-12, 2018, 4 pages.

* cited by examiner

FIG. 3

| TRANSFORM TYPE | BASIS FUNCTION $T_i(j)$, $i, j = 0, 1, \ldots, N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$ <br> WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$ <br> WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

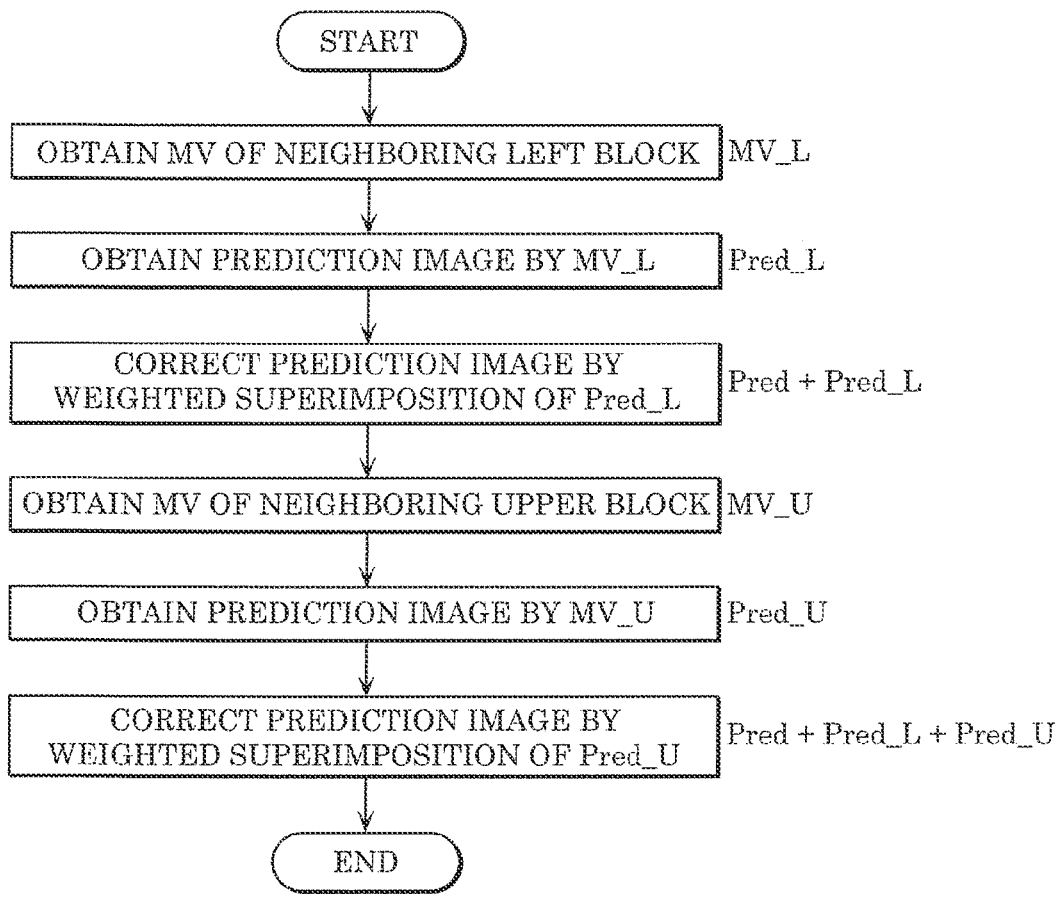
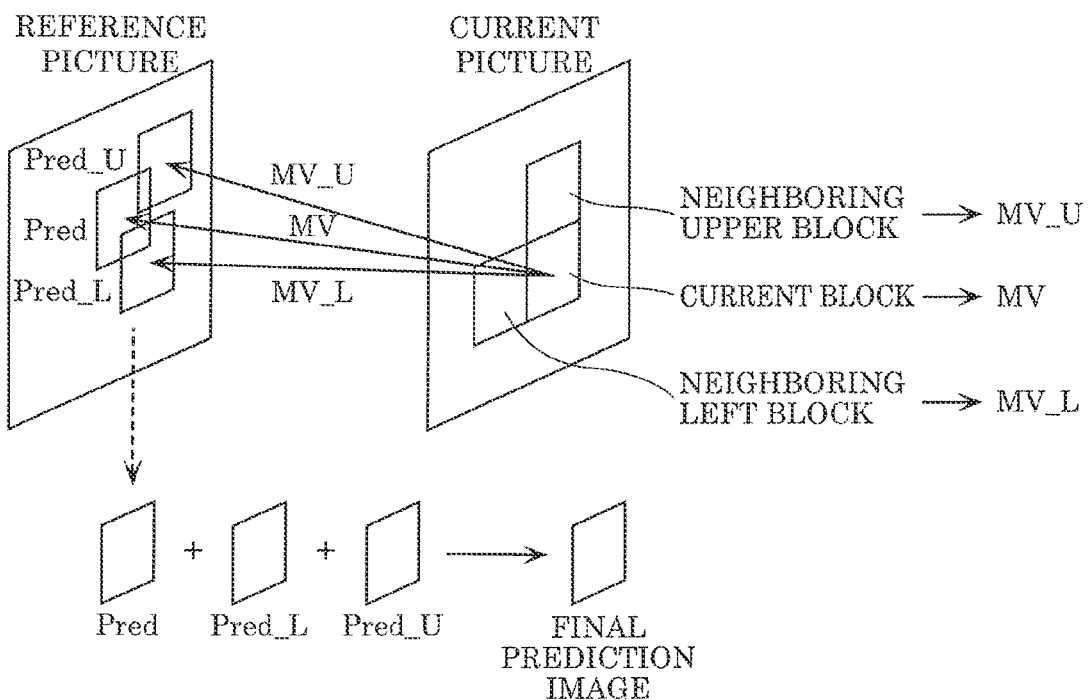

TEMPLATE GENERATED BASED ON REFERENCE PIXEL OF
CANDIDATE MV (L0) AND REFERENCE PIXEL OF CANDIDATE MV (L1)

CORRESPONDING BLOCK

IMAGE BLOCK

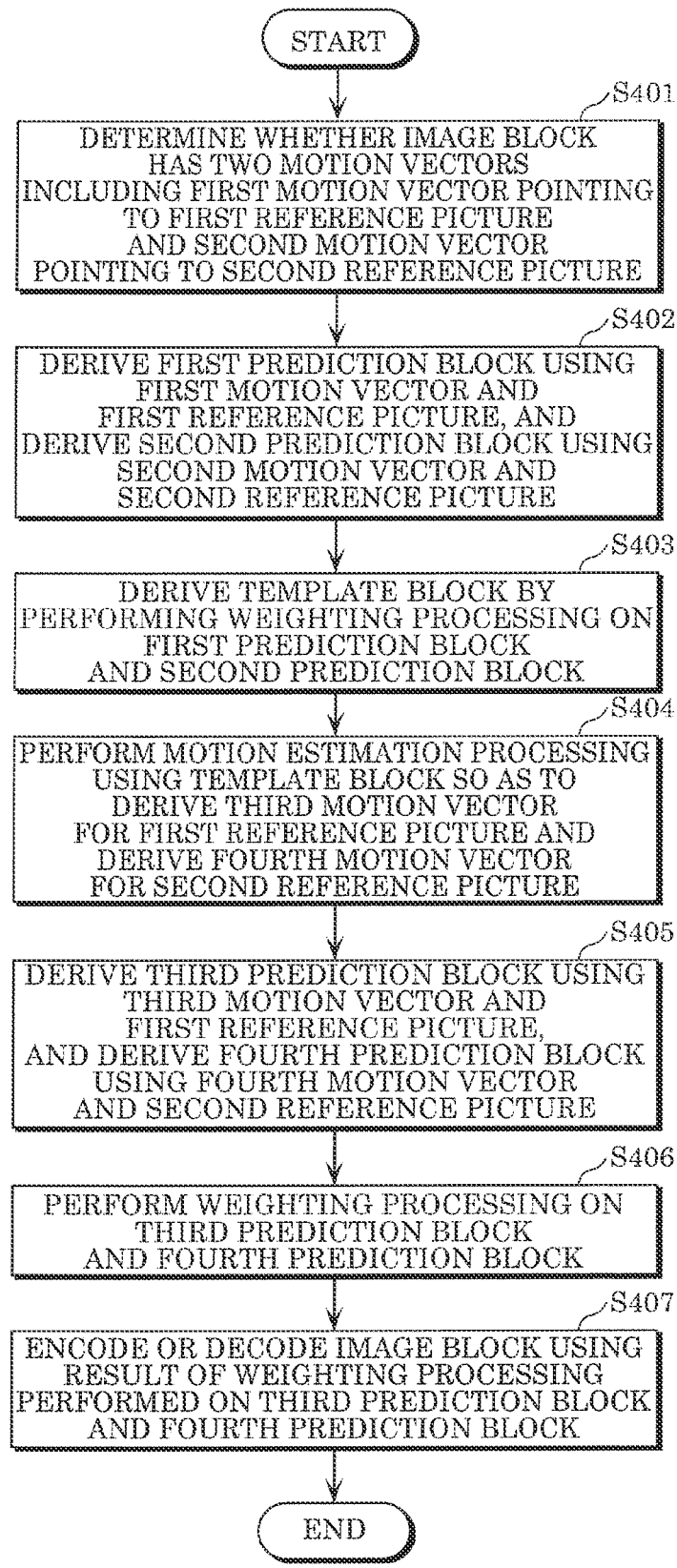

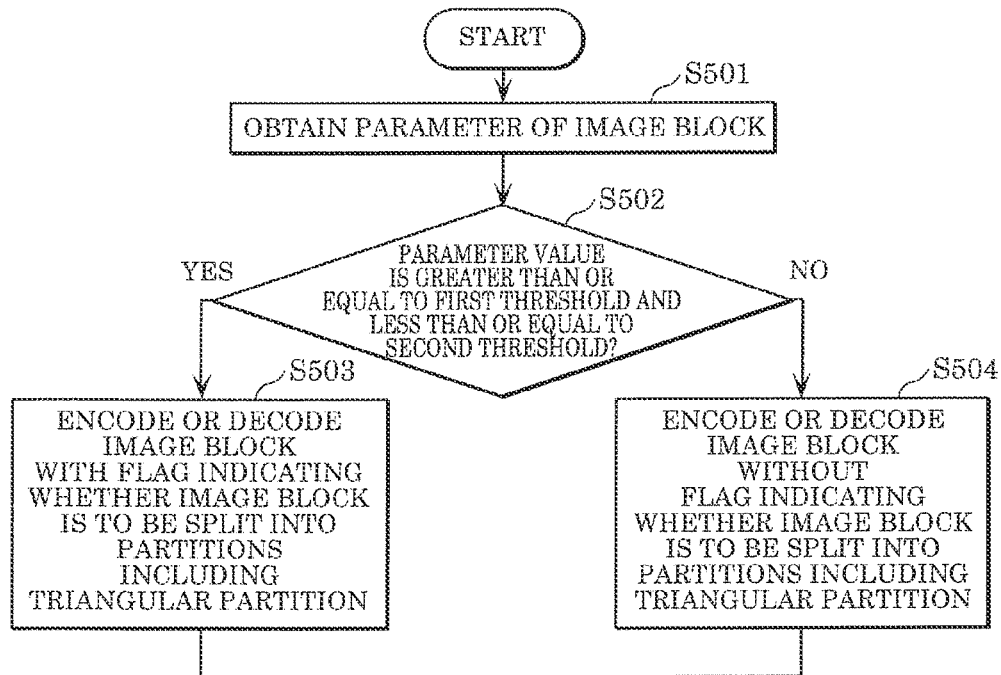
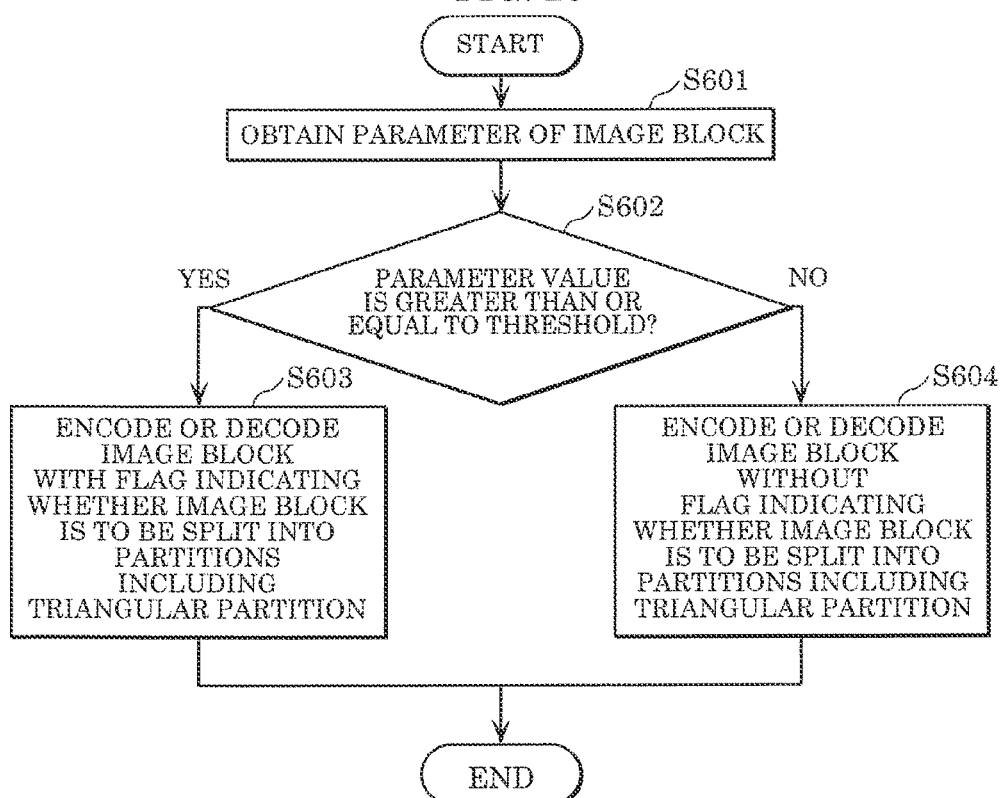

ENCODER, DECODER, ENCODING METHOD, AND DECODING METHOD

CROSS REFERENCE TO RELATED APPLICATIONS

This application is a U.S. continuation application of U.S. patent application Ser. No. 18/056,542, filed Nov. 17, 2022, which is a U.S. continuation application of U.S. patent application Ser. No. 18/056,136, filed Nov. 16, 2022, which is a U.S. continuation application of U.S. patent application Ser. No. 17/323,936, filed May 18, 2021, which is a U.S. continuation application of U.S. patent application Ser. No. 16/942,601 filed on Jul. 29, 2020, now U.S. Pat. No. 11,044,491, which is a continuation of PCT International Patent Application Number PCT/JP2019/003072 filed on Jan. 30, 2019, claiming the benefit of priority of U.S. Provisional Patent Application No. 62/623,841 filed on Jan. 30, 2018, the entire contents of which are hereby incorporated by reference.

BACKGROUND

1. Technical Field

The present disclosure relates to an encoder and related technologies for encoding an image block.

2. Description of the Related Art

Conventionally, H.265, which is also referred to as high efficiency video coding (HEVC), has been known as a standard for encoding videos (Non-Patent Literature 1: H.265 (ISO/IEC 23008-2 HEVC)/HEVC (high efficiency video coding)).

SUMMARY

An encoder according to an aspect of the present disclosure is an encoder which includes circuitry and memory. Using the memory, the circuitry: splits an image block into a plurality of partitions; obtains a prediction image for a partition included in the plurality of partitions; and encodes the image block using the prediction image. In obtaining the prediction image, the circuitry: determines whether the partition is a non-rectangular partition; when the partition is determined not to be a non-rectangular partition, obtains (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtains the first prediction image as the prediction image using the first motion vector, without using the second motion vector.

Note that these general or specific aspects may be implemented by a system, a device, a method, an integrated circuit, a computer program, or a non-transitory computer-readable recording medium such as a compact disc read only memory (CD-ROM), or by any combination of systems, devices, methods, integrated circuits, computer programs, or recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 5B is a flow chart for illustrating an outline of a prediction image correction process performed via OBMC processing;

FIG. 5C is a conceptual diagram for illustrating an outline of a prediction image correction process performed via OBMC processing;

FIG. 18 is a flow chart illustrating DMVR processing according to Embodiment 1;

FIG. 19 is a flow chart illustrating a first example of encoding processing and decoding processing for a flag according to Embodiment 1;

FIG. 20 is a flow chart illustrating a second example of encoding processing and decoding processing for a flag according to Embodiment 1;

DETAILED DESCRIPTION OF THE EMBODIMENTS

Figure 1:
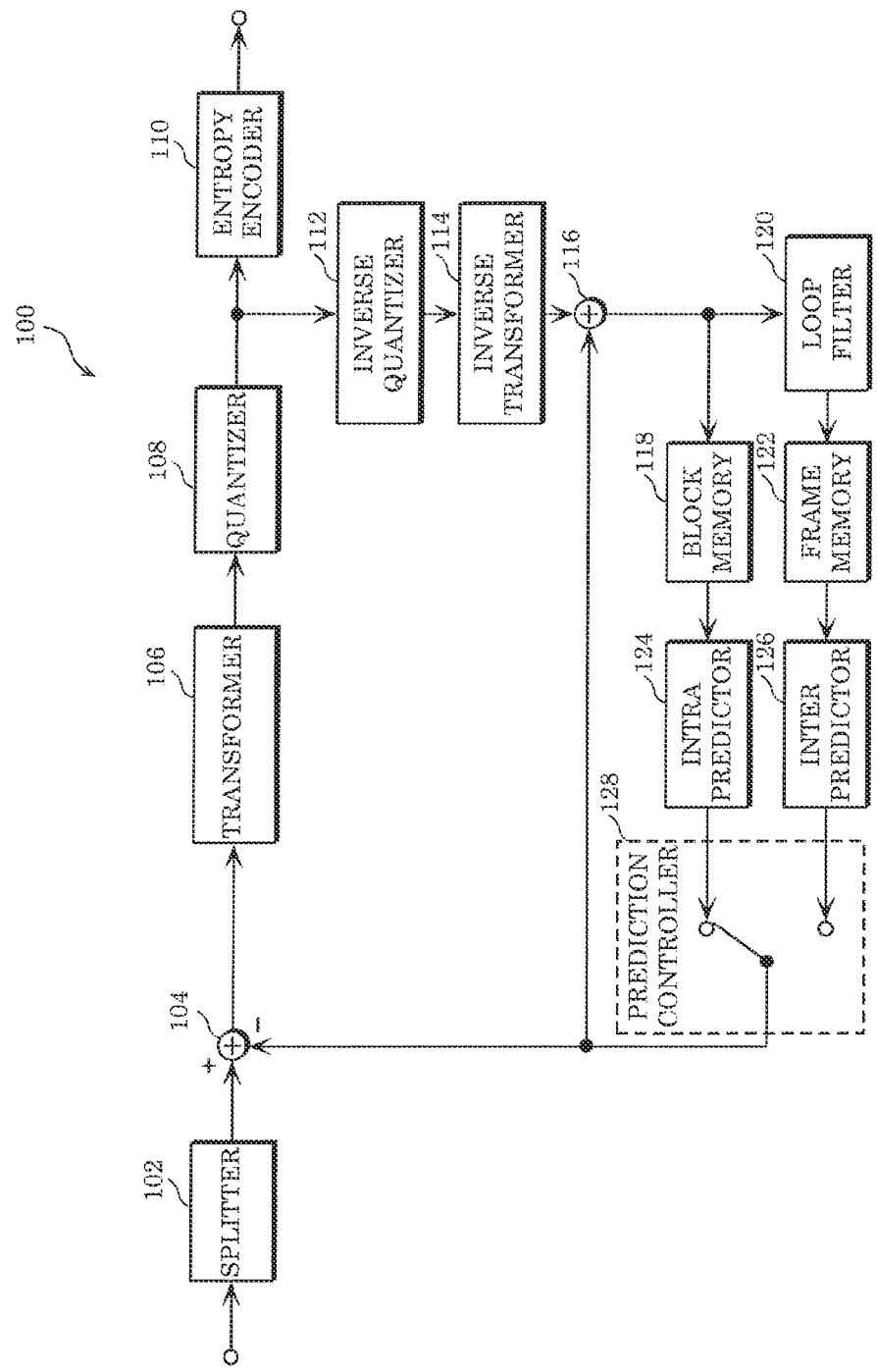
FIG. 1 is a block diagram illustrating a functional configuration of an encoder according to Embodiment 1.

For example, when an encoder encodes an image block included in a video, the encoder splits the image block into a plurality of partitions, and performs prediction processing on each partition. The encoder may perform inter prediction on the partitions. The encoder then encodes the image block using the result of the prediction processing. Specifically, the encoder encodes a difference obtained by taking away, from the image block, a prediction image obtained through prediction processing. This reduces the encoding amount.

When a decoder decodes an image block included in a video, the decoder also splits the image block into a plurality of partitions, and performs prediction processing on each partition. The decoder may perform inter prediction on the partitions. The decoder then decodes the image block using the result of the prediction processing. Specifically, the decoder reconstructs the image block by decoding the encoded difference and adding a prediction image obtained through prediction processing to the encoded difference. By doing so, the image block is decoded.

With regard to the splitting of the image block, splitting the image block into a plurality of partitions including a non-rectangular partition is under consideration. However, when the image block is split into a plurality of partitions including a non-rectangular partition, the prediction processing becomes complicated, resulting in an increase in the processing amount.

In view of the above, an encoder according to an aspect of the present disclosure is an encoder which includes circuitry and memory. The circuitry encodes an image block using the memory. In encoding the image block, the circuitry: obtains one or more size parameters related to the size of the image block; determines whether the one or more size parameters and one or more thresholds satisfy a determined relationship; encodes a split parameter when the one or more size parameters and the one or more thresholds are determined to satisfy the determined relationship, the split parameter indicating whether the image block is to be split into a plurality of partitions including a non-rectangular partition; and encodes the image block after splitting the image block into the plurality of partitions when the split parameter indicates that the image block is to be split into the plurality of partitions. The determined relationship may be predetermined.

With this, the encoder can switch whether or not to split the image block into a plurality of partitions including a non-rectangular partition, when the one or more size parameters related to the size of the image block and the one or more thresholds satisfy the determined relationship. Accordingly, the encoder can efficiently process the image block.

For example, the circuitry encodes the image block without encoding the split parameter when the one or more size parameters and the one or more thresholds are determined not to satisfy the determined relationship.

With this, the encoding amount can be reduced. Moreover, the encoder can reduce the processing amount for encoding the split parameter.

For example, the circuitry encodes the image block without splitting the image block or encodes the image block after splitting the image block into a plurality of rectangular partitions, when the one or more size parameters and the one or more thresholds are determined not to satisfy the determined relationship.

With this, the encoder can reduce splitting of the image block into a plurality of partitions including a non-rectangular partition.

For example, the circuitry encodes the image block without splitting the image block or encodes the image block after splitting the image block into a plurality of rectangular partitions, when the split parameter indicates that the image block is not to be split into the plurality of partitions.

With this, the encoder can reduce splitting of the image block into a plurality of partitions including a non-rectangular partition.

For example, the one or more thresholds comprise one threshold, and the determined relationship is that each of the one or more size parameters is greater than or equal to the one threshold, or that at least one of the one or more size parameters is greater than or equal to the one threshold.

With this, the encoder can switch whether or not to split the image block into a plurality of partitions including a non-rectangular partition, when the one or more size parameters are greater than or equal to the one threshold.

For example, the one or more thresholds comprise a first threshold and a second threshold, the first threshold is less than or equal to the second threshold, and the determined relationship is that each of the one or more size parameters is greater than or equal to the first threshold and less than or equal to the second threshold, or that at least one of the one or more size parameters is greater than or equal to the first threshold and less than or equal to the second threshold.

With this, the encoder can switch whether or not to split the image block into a plurality of partitions including a non-rectangular partition, when the one or more size parameters are greater than or equal to the first threshold and less than or equal to the second threshold.

For example, the non-rectangular partition is a triangular partition.

With this, the encoder can switch whether or not to split the image block into a plurality of partitions including a triangular partition, when the one or more size parameters related to the size of the image block and the one or more thresholds satisfy the determined relationship.

For example, the one or more size parameters include at least one of a ratio of the width of the image block to the height of the image block, a ratio of the height of the image block to the width of the image block, the width of the image block, or the height of the image block.

With this, the encoder can use, as a size parameter, at least one of the ratio of the width to the height of the image block, the ratio of the height to the width of the image block, the width of the image block, or the height of the image block.

For example, each of the one or more thresholds is greater than or equal to zero.

With this, the encoder can switch whether or not to split the image block into a plurality of partitions including a non-rectangular partition, when the one or more size parameters and the one or more thresholds, each of which is greater than or equal to zero, satisfy the determined relationship.

For example, the one or more thresholds indicate a restricted range of a ratio of the width of the image block to the height of the image block. Here, the restricted range is a range for splitting the image block into the plurality of partitions.

With this, the encoder can switch whether or not to split the image block into a plurality of partitions including a non-rectangular partition, when the one or more size parameters and the one or more thresholds, which indicate a restricted range of the ratio of the width to the height, satisfy the determined relationship.

For example, a decoder according to an aspect of the present disclosure is a decoder which includes circuitry and memory. The circuitry decodes an image block using the memory. In decoding the image block, the circuitry: obtains one or more size parameters related to the size of the image block; determines whether the one or more size parameters and one or more thresholds satisfy a determined relationship; decodes a split parameter when the one or more size parameters and the one or more thresholds are determined to satisfy the determined relationship, the split parameter indicating whether the image block is to be split into a plurality of partitions including a non-rectangular partition; and decodes the image block after splitting the image block into the plurality of partitions when the split parameter indicates that the image block is to be split into the plurality of partitions. The determined relationship may be predetermined.

With this, the decoder can switch whether or not to split the image block into a plurality of partitions including a non-rectangular partition, when the one or more size parameters related to the size of the image block and the one or more thresholds satisfy the determined relationship. Accordingly, the decoder can efficiently process the image block.

For example, the circuitry decodes the image block without decoding the split parameter when the one or more size parameters and the one or more thresholds are determined not to satisfy the determined relationship.

With this, the encoding amount can be reduced. Moreover, the decoder can reduce the amount of processing for decoding the split parameter.

For example, the circuitry decodes the image block without splitting the image block or decodes the image block after splitting the image block into a plurality of rectangular partitions, when the one or more size parameters and the one or more thresholds are determined not to satisfy the determined relationship.

With this, the decoder can reduce splitting of the image block into a plurality of partitions including a non-rectangular partition.

For example, the circuitry decodes the image block without splitting the image block or decodes the image block after splitting the image block into a plurality of rectangular partitions, when the split parameter indicates that the image block is not to be split into the plurality of partitions.

With this, the decoder can reduce splitting of the image block into a plurality of partitions including a non-rectangular partition.

For example, the one or more thresholds comprise one threshold, and the determined relationship is that each of the one or more size parameters is greater than or equal to the one threshold, or that at least one of the one or more size parameters is greater than or equal to the one threshold.

With this, the decoder can switch whether or not to split the image block into a plurality of partitions including a non-rectangular partition, when the one or more size parameters are greater than or equal to the one threshold.

For example, the one or more thresholds comprise a first threshold and a second threshold, the first threshold is less than or equal to the second threshold, and the determined relationship is that each of the one or more size parameters is greater than or equal to the first threshold and less than or equal to the second threshold, or that at least one of the one or more size parameters is greater than or equal to the first threshold and less than or equal to the second threshold.

With this, the decoder can switch whether or not to split the image block into a plurality of partitions including a non-rectangular partition, when the one or more size parameters are greater than or equal to the first threshold and less than or equal to the second threshold.

For example, the non-rectangular partition is a triangular partition.

With this, the decoder can switch whether or not to split the image block into a plurality of partitions including a triangular partition, when the one or more size parameters related to the size of the image block and the one or more thresholds satisfy the determined relationship.

For example, the one or more size parameters include at least one of a ratio of the width of the image block to the height of the image block, a ratio of the height of the image block to the width of the image block, the width of the image block, or the height of the image block.

With this, the decoder can use, as a size parameter, at least one of the ratio of the width to the height of the image block, the ratio of the height to the width of the image block, the width of the image block, or the height of the image block.

For example, each of the one or more thresholds is greater than or equal to zero.

With this, the decoder can switch whether or not to split the image block into a plurality of partitions including a non-rectangular partition, when the one or more size parameters and the one or more thresholds, each of which is greater than or equal to zero, satisfy the determined relationship.

For example, the one or more thresholds indicate a restricted range of a ratio of the width of the image block to the height of the image block. Here, the restricted range is a range for splitting the image block into the plurality of partitions.

With this, the decoder can switch whether or not to split the image block into a plurality of partitions including a non-rectangular partition, when the one or more size parameters and the one or more thresholds, which indicate a restricted range of the ratio of the width to the height, satisfy the determined relationship.

For example, an encoding method according to an aspect of the present disclosure is an encoding method which includes encoding an image block. The encoding of the image block includes: obtaining one or more size parameters related to the size of the image block; determining whether the one or more size parameters and one or more thresholds satisfy a determined relationship; encoding a split parameter when the one or more size parameters and the one or more thresholds are determined to satisfy the determined relationship, the split parameter indicating whether the image block is to be split into a plurality of partitions including a non-rectangular partition; and encoding the image block after splitting the image block into the plurality of partitions when the split parameter indicates that the image block is to be split into the plurality of partitions. The determined relationship may be predetermined.

With this, it is possible to switch whether or not to split the image block into a plurality of partitions including a non-rectangular partition, when the one or more size parameters related to the size of the image block and the one or more thresholds satisfy the determined relationship. Accordingly, the image block can be efficiently processed.

For example, a decoding method according to an aspect of the present disclosure is a decoding method which includes decoding an image block. The decoding of the image block includes: obtaining one or more size parameters related to the size of the image block; determining whether the one or more size parameters and one or more thresholds satisfy a determined relationship; decoding a split parameter when the one or more size parameters and the one or more thresholds are determined to satisfy the determined relationship, the split parameter indicating whether the image block is to be split into a plurality of partitions including a non-rectangular partition; and decoding the image block after splitting the image block into the plurality of partitions when the split parameter indicates that the image block is to be split into the plurality of partitions. The determined relationship may be predetermined.

With this, it is possible to switch whether or not to split the image block into a plurality of partitions including a non-rectangular partition, when the one or more size parameters related to the size of the image block and the one or more thresholds satisfy the determined relationship. Accordingly, the image block can be efficiently processed.

For example, an encoder according to an aspect of the present disclosure is an encoder which includes circuitry and memory. Using the memory, the circuitry splits an image block into a plurality of partitions, obtains a prediction image for a partition included in the plurality of partitions, and encodes the image block using the prediction image. In obtaining the prediction image, the circuitry: determines whether the partition is a non-rectangular partition; when the partition is determined not to be a non-rectangular partition, obtains (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtains the first prediction image as the prediction image using the first motion vector, without using the second motion vector.

With this, the encoder can reduce the two-step operation for non-rectangular partitions, and suppress an increase in the processing amount. Accordingly, the encoder can efficiently process the image block.

For example, the circuitry determines that the partition is a non-rectangular partition when the partition is a triangular partition.

With this, the encoder can suppress an increase in the processing amount for triangular partitions.

For example, the prediction image obtained when the partition is determined not to be a non-rectangular partition is the same as a portion corresponding to the partition, of a prediction image obtained for the image block without splitting the image block into the plurality of partitions in a determined prediction mode. The determined prediction mode may be predetermined.

With this, the encoder can obtain a prediction image for a rectangular partition in the same manner as in the case of obtaining a prediction image for the image block without splitting the image block into a plurality of partitions. Accordingly, the encoder can simplify the processing.

For example, the circuitry obtains the second motion vector by performing motion estimation using the first prediction image.

With this, the encoder can obtain an appropriate second motion vector using the first prediction image, and obtain an appropriate second prediction image using the appropriate second motion vector.

For example, a decoder according to an aspect of the present disclosure is a decoder which includes circuitry and memory. Using the memory, the circuitry splits an image block into a plurality of partitions, obtains a prediction image for a partition included in the plurality of partitions, and decodes the image block using the prediction image. In obtaining the prediction image, the circuitry: determines whether the partition is a non-rectangular partition; when the partition is determined not to be a non-rectangular partition, obtains (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtains the first prediction image as the prediction image using the first motion vector, without using the second motion vector.

With this, the decoder can reduce the two-step operation for non-rectangular partitions, and suppress an increase in the processing amount. Accordingly, the decoder can efficiently process the image block.

For example, the circuitry determines that the partition is a non-rectangular partition when the partition is a triangular partition.

With this, the decoder can suppress an increase in the processing amount for triangular partitions.

For example, the prediction image obtained when the partition is determined not to be a non-rectangular partition is the same as a portion corresponding to the partition, of a prediction image obtained for the image block without splitting the image block into the plurality of partitions in a determined prediction mode. The determined prediction mode may be predetermined.

With this, the decoder can obtain a prediction image for a rectangular partition in the same manner as in the case of obtaining a prediction image for the image block without splitting the image block into a plurality of partitions. Accordingly, the decoder can simplify the processing.

For example, the circuitry obtains the second motion vector by performing motion estimation using the first prediction image.

With this, the decoder can obtain an appropriate second motion vector using the first prediction image, and obtain an appropriate second prediction image using the appropriate second motion vector.

For example, an encoding method according to an aspect of the present disclosure is an encoding method which includes: splitting an image block into a plurality of partitions; obtaining a prediction image for a partition included in the plurality of partitions; and encoding the image block using the prediction image. The obtaining of the prediction image includes: determining whether the partition is a non-rectangular partition; when the partition is determined not to be a non-rectangular partition, obtaining (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtaining the first prediction image as the prediction image using the first motion vector, without using the second motion vector.

With this, it is possible to reduce the two-step operation for non-rectangular partitions, and suppress an increase in the processing amount. Accordingly, the image block can be efficiently processed.

For example, a decoding method according to an aspect of the present disclosure is a decoding method which includes: splitting an image block into a plurality of partitions; obtaining a prediction image for a partition included in the plurality of partitions; and decoding the image block using the prediction image. The obtaining of the prediction image includes: determining whether the partition is a non-rectangular partition; when the partition is determined not to be a non-rectangular partition, obtaining (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtaining the first prediction image as the prediction image using the first motion vector, without using the second motion vector.

With this, it is possible to reduce the two-step operation for non-rectangular partitions, and suppress an increase in the processing amount. Accordingly, the image block can be efficiently processed.

For example, an encoder according to an aspect of the present disclosure is an encoder which includes circuitry and memory. Using the memory, the circuitry splits an image block into a plurality of partitions, obtains a prediction image for a partition included in the plurality of partitions, and encodes the image block using the prediction image. In obtaining the prediction image, the circuitry: determines whether the partition is a non-rectangular partition; when the partition is determined not to be a non-rectangular partition, obtains (i) a first prediction image for the partition, (ii) a gradient image for the first prediction image, and (iii) a second prediction image as the prediction image using the first prediction image and the gradient image; and when the partition is determined to be a non-rectangular partition, obtains the first prediction image as the prediction image without using the gradient image.

With this, the encoder can reduce use of a gradient image for non-rectangular partitions, and suppress an increase in the processing amount. Accordingly, the encoder can efficiently process the image block.

For example, the circuitry determines that the partition is a non-rectangular partition when the partition is a triangular partition.

With this, the encoder can suppress an increase in the processing amount for triangular partitions.

For example, the prediction image obtained when the partition is determined not to be a non-rectangular partition is the same as a portion corresponding to the partition, of a prediction image obtained for the image block without splitting the image block into the plurality of partitions in a determined prediction mode. The determined prediction mode may be predetermined.

With this, the encoder can obtain a prediction image for a rectangular partition in the same manner as in the case of obtaining a prediction image for the image block without splitting the image block into a plurality of partitions. Accordingly, the encoder can simplify the processing.

For example, the circuitry obtains the gradient image by applying a filter to the first prediction image to extract a difference value between pixels.

With this, the encoder can obtain an appropriate gradient image for the first prediction image, and obtain an appropriate second prediction image using the appropriate gradient image.

For example, a decoder according to an aspect of the present disclosure is a decoder which includes circuitry and memory. Using the memory, the circuitry splits an image block into a plurality of partitions, obtains a prediction image for a partition included in the plurality of partitions, and decodes the image block using the prediction image. In obtaining the prediction image, the circuitry: determines whether the partition is a non-rectangular partition; when the partition is determined not to be a non-rectangular partition, obtains (i) a first prediction image for the partition, (ii) a gradient image for the first prediction image, and (iii) a second prediction image as the prediction image using the first prediction image and the gradient image; and when the partition is determined to be a non-rectangular partition, obtains the first prediction image as the prediction image without using the gradient image.

With this, the decoder can reduce use of a gradient image for non-rectangular partitions, and suppress an increase in the processing amount. Accordingly, the decoder can efficiently process the image block.

For example, the circuitry determines that the partition is a non-rectangular partition when the partition is a triangular partition.

With this, the decoder can suppress an increase in the processing amount for triangular partitions.

For example, the prediction image obtained when the partition is determined not to be a non-rectangular partition is the same as a portion corresponding to the partition, of a prediction image obtained for the image block without splitting the image block into the plurality of partitions in a determined prediction mode. The determined prediction mode may be predetermined.

With this, the decoder can obtain a prediction image for a rectangular partition in the same manner as in the case of obtaining a prediction image for the image block without splitting the image block into a plurality of partitions. Accordingly, the decoder can simplify the processing.

For example, the circuitry obtains the gradient image by applying a filter to the first prediction image to extract a difference value between pixels.

With this, the decoder can obtain an appropriate gradient image for the first prediction image, and obtain an appropriate second prediction image using the appropriate gradient image.

For example, an encoding method according to an aspect of the present disclosure is an encoding method which includes: splitting an image block into a plurality of partitions; obtaining a prediction image for a partition included in the plurality of partitions; and encoding the image block using the prediction image. The obtaining of the prediction image includes: determining whether the partition is a non-rectangular partition; when the partition is determined not to be a non-rectangular partition, obtaining (i) a first prediction image for the partition, (ii) a gradient image for the first prediction image, and (iii) a second prediction image as the prediction image using the first prediction image and the gradient image; and when the partition is determined to be a non-rectangular partition, obtaining the first prediction image as the prediction image without using the gradient image.

With this, it is possible to suppress an increase in the processing amount for non-rectangular partitions. Accordingly, the image block can be efficiently processed.

For example, a decoding method according to an aspect of the present disclosure is a decoding method which includes: splitting an image block into a plurality of partitions; obtaining a prediction image for a partition included in the plurality of partitions; and decoding the image block using the prediction image. The obtaining of the prediction image includes: determining whether the partition is a non-rectangular partition; when the partition is determined not to be a non-rectangular partition, obtaining (i) a first prediction image for the partition, (ii) a gradient image for the first prediction image, and (iii) a second prediction image as the prediction image using the first prediction image and the gradient image; and when the partition is determined to be a non-rectangular partition, obtaining the first prediction image as the prediction image without using the gradient image.

With this, it is possible to suppress an increase in the processing amount for non-rectangular partitions. Accordingly, the image block can be efficiently processed.

For example, an encoder according to an aspect of the present disclosure is an encoder which includes circuitry and memory. Using the memory, the circuitry: splits an image block into a plurality of partitions; generates a motion vector candidate list for a partition included in the plurality of partitions; obtains a motion vector for the partition from the motion vector candidate list; performs inter prediction processing for the partition using the motion vector for the partition; and encodes the image block using a result of the inter prediction processing. In generating the motion vector candidate list, the circuitry: determines whether the partition is a non-rectangular partition; when the partition is determined not to be a non-rectangular partition, generates the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generates the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

With this, the encoder can reduce, for non-rectangular partitions, use of a plurality of motion vectors for a plurality of sub-partitions, and suppress an increase in the processing amount. Accordingly, the encoder can efficiently process the image block.

For example, the circuitry determines that the partition is a non-rectangular partition when the partition is a triangular partition.

With this, the encoder can suppress an increase in the processing amount for triangular partitions.

For example, the plurality of motion vectors for the plurality of sub-partitions include motion vectors predicted from motion vectors for regions which spatially or temporally neighbor the plurality of sub-partitions.

With this, the encoder can use a motion vector which is predicted, as a motion vector for a sub-partition, from a motion vector for a region neighboring the sub-partition.

For example, the motion vector candidate list generated when the partition is determined not to be a non-rectangular partition is the same as a motion vector candidate list generated for the image block in a determined prediction mode. The determined prediction mode may be predetermined.

With this, the encoder can generate the motion vector candidate list for a rectangular partition in the same manner as in the case of generating a motion vector candidate list for the image block. Accordingly, the encoder can simplify the processing.

For example, each of the plurality of temporally neighboring partitions is a co-located partition which, in a picture different from a picture that includes the partition, is located in a position that corresponds to a position of the partition.

With this, the encoder can use the motion vector for the co-located partition as a motion vector for the temporally neighboring partition.

For example, a decoder according to an aspect of the present disclosure is a decoder which includes circuitry and memory. Using the memory, the circuitry: splits an image block into a plurality of partitions; generates a motion vector candidate list for a partition included in the plurality of partitions; obtains a motion vector for the partition from the motion vector candidate list; performs inter prediction processing for the partition using the motion vector for the partition; and decodes the image block using a result of the inter prediction processing. In generating the motion vector candidate list, the circuitry: determines whether the partition is a non-rectangular partition; when the partition is determined not to be a non-rectangular partition, generates the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generates the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

With this, the decoder can reduce, for non-rectangular partitions, use of a plurality of motion vectors for a plurality of sub-partitions, and suppress an increase in the processing amount. Accordingly, the decoder can efficiently process the image block.

For example, the circuitry determines that the partition is a non-rectangular partition when the partition is a triangular partition.

With this, the decoder can suppress an increase in the processing amount for triangular partitions.

For example, the plurality of motion vectors for the plurality of sub-partitions include motion vectors predicted from motion vectors for regions which spatially or temporally neighbor the plurality of sub-partitions.

With this, the decoder can use a motion vector which is predicted, as a motion vector for a sub-partition, from a motion vector for a region neighboring the sub-partition.

For example, the motion vector candidate list generated when the partition is determined not to be a non-rectangular partition is the same as a motion vector candidate list generated for the image block in a determined prediction mode. The determined prediction mode may be predetermined.

With this, the decoder can generate the motion vector candidate list for a rectangular partition in the same manner as in the case of generating a motion vector candidate list for the image block. Accordingly, the decoder can simplify the processing.

For example, each of the plurality of temporally neighboring partitions is a co-located partition which, in a picture different from a picture that includes the partition, is located in a position that corresponds to a position of the partition.

With this, the decoder can use the motion vector for the co-located partition as a motion vector for the temporally neighboring partition.

For example, an encoding method according to an aspect of the present disclosure is an encoding method which includes: splitting an image block into a plurality of partitions; generating a motion vector candidate list for a partition included in the plurality of partitions; obtaining a motion vector for the partition from the motion vector candidate list; performing inter prediction processing for the partition using the motion vector for the partition; and encoding the image block using a result of the inter prediction processing. The generating of the motion vector candidate list includes: determining whether the partition is a non-rectangular partition; when the partition is determined not to be a non-rectangular partition, generating the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generating the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

With this, it is possible to reduce, for non-rectangular partitions, use of a plurality of motion vectors for a plurality of sub-partitions, and suppress an increase in the processing amount. Accordingly, the image block can be efficiently processed.

For example, a decoding method according to an aspect of the present disclosure is a decoding method which includes: splitting an image block into a plurality of partitions; generating a motion vector candidate list for a partition included in the plurality of partitions; obtaining a motion vector for the partition from the motion vector candidate list; performing inter prediction processing for the partition using the motion vector for the partition; and decoding the image block using a result of the inter prediction processing. The generating of the motion vector candidate list includes: determining whether the partition is a non-rectangular partition; when the partition is determined not to be a non-rectangular partition, generating the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generating the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

With this, it is possible to reduce, for non-rectangular partitions, use of a plurality of motion vectors for a plurality of sub-partitions, and suppress an increase in the processing amount. Accordingly, the image block can be efficiently processed.

Moreover, for example, the encoder according to an aspect of the present disclosure includes a splitter, an intra predictor, an inter predictor, a transformer, a quantizer, an entropy encoder, and a loop filter. The splitter splits a picture into a plurality of image blocks. The intra predictor performs intra prediction on an image block included in the plurality of image blocks.

The inter predictor performs inter prediction on the image block. The transformer generates transform coefficients by transforming prediction errors between an original image and a prediction image obtained through the intra prediction or the inter prediction. The quantizer generates quantized coefficients by quantizing the transform coefficients. The entropy encoder generates an encoded bitstream by encoding the quantized coefficients. The loop filter applies a filter to a reconstructed image generated using the prediction image.

For example, the entropy encoder encodes the image block. In encoding the image block, the entropy encoder: obtains one or more size parameters related to the size of the image block; determines whether the one or more size parameters and one or more thresholds satisfy a determined relationship; encodes a split parameter when the one or more size parameters and the one or more thresholds are determined to satisfy the determined relationship, the split parameter indicating whether the image block is to be split into a plurality of partitions including a non-rectangular partition; and encodes the image block after splitting the image block into the plurality of partitions when the split parameter indicates that the image block is to be split into the plurality of partitions. The determined relationship may be predetermined.

For example, the inter predictor splits the image block into a plurality of partitions, and obtains a prediction image for a partition included in the plurality of partitions. In obtaining the prediction image, the inter predictor: determines whether the partition is a non-rectangular partition; when the partition is determined not to be a non-rectangular partition, obtains (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtains the first prediction image as the prediction image using the first motion vector, without using the second motion vector.

For example, the inter predictor splits the image block into a plurality of partitions, and obtains a prediction image for a partition included in the plurality of partitions. In obtaining the prediction image, the inter predictor: determines whether the partition is a non-rectangular partition; when the partition is determined not to be a non-rectangular partition, obtains (i) a first prediction image for the partition, (ii) a gradient image for the first prediction image, and (iii) a second prediction image as the prediction image using the first prediction image and the gradient image; and when the partition is determined to be a non-rectangular partition, obtains the first prediction image as the prediction image without using the gradient image.

For example, the inter predictor: splits the image block into a plurality of partitions; generates a motion vector candidate list for a partition included in the plurality of partitions; obtains a motion vector for the partition from the motion vector candidate list; and performs inter prediction processing for the partition using the motion vector for the partition. In generating the motion vector candidate list, the inter predictor: determines whether the partition is a non-rectangular partition; when the partition is determined not to be a non-rectangular partition, generates the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generates the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

Moreover, for example, the decoder according to an aspect of the present disclosure includes an entropy decoder, an inverse quantizer, an inverse transformer, an intra predictor, an inter predictor, and a loop filter. The entropy decoder decodes quantized coefficients of a partition in a picture, from an encoded bitstream. The inverse quantizer inverse-quantizes the quantized coefficients to obtain transform coefficients. The inverse transformer inverse-transforms the transform coefficients to obtain a prediction error. The intra predictor performs intra prediction on the partition. The inter predictor performs inter prediction on the partition. The loop filter applies a filter to a reconstructed image generated using the prediction image obtained through the intra prediction or the inter prediction and the prediction error.

For example, the entropy decoder decodes the image block using the memory. In decoding the image block, the entropy decoder: obtains one or more size parameters related to a size of the image block; determines whether the one or more size parameters and one or more thresholds satisfy a determined relationship; decodes a split parameter when the one or more size parameters and the one or more thresholds are determined to satisfy the determined relationship, the split parameter indicating whether the image block is to be split into a plurality of partitions including a non-rectangular partition; and decodes the image block after splitting the image block into the plurality of partitions when the split parameter indicates that the image block is to be split into the plurality of partitions. The determined relationship may be predetermined.

For example, the inter predictor splits the image block into a plurality of partitions, and obtains a prediction image for a partition included in the plurality of partitions. In obtaining the prediction image, the inter predictor: determines whether the partition is a non-rectangular partition; when the partition is determined not to be a non-rectangular partition, obtains (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtains the first prediction image as the prediction image using the first motion vector, without using the second motion vector.

For example, the inter predictor splits the image block into a plurality of partitions, and obtains a prediction image for a partition included in the plurality of partitions. In obtaining the prediction image, the inter predictor: determines whether the partition is a non-rectangular partition; when the partition is determined not to be a non-rectangular partition, obtains (i) a first prediction image for the partition, (ii) a gradient image for the first prediction image, and (iii) a second prediction image as the prediction image using the first prediction image and the gradient image; and when the partition is determined to be a non-rectangular partition, obtains the first prediction image as the prediction image without using the gradient image.

For example, the inter predictor splits the image block into a plurality of partitions; generates a motion vector candidate list for a partition included in the plurality of partitions; obtains a motion vector for the partition from the motion vector candidate list; and performs inter prediction processing for the partition using the motion vector for the partition. In generating the motion vector candidate list, the inter predictor: determines whether the partition is a non-rectangular partition; when the partition is determined not to be a non-rectangular partition, generates the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generates the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

Note that these general or specific aspects may be implemented by a system, a device, a method, an integrated circuit, a computer program, or a non-transitory computer-readable recording medium such as a CD-ROM, or by any combination of systems, devices, methods, integrated circuits, computer programs, or recording media.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
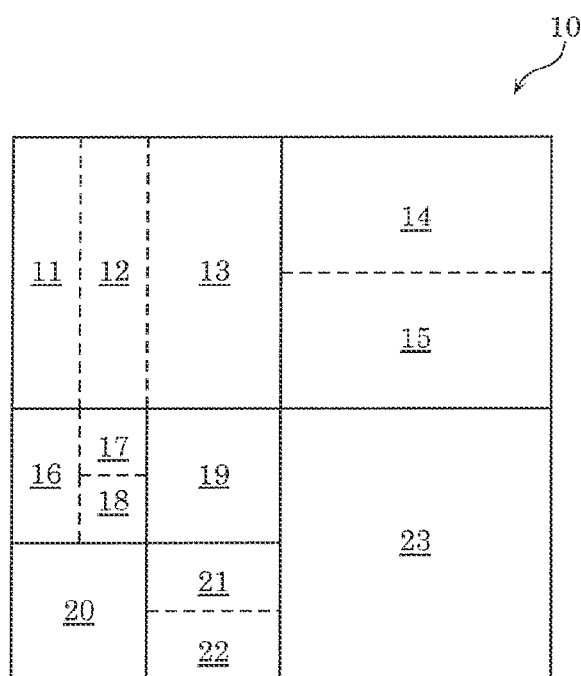
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a defined discrete cosine transform (DCT) or discrete sine transform (DST) to spatial domain prediction errors. The defined transform may be predefined.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a determined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112. The determined scanning order may be predetermined.

A determined order is an order for quantizing/inverse quantizing transform coefficients. For example, a determined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a determined scanning order, quantized coefficients of the current block. Inverse quantizer 112 then outputs the inverse quantized transform coefficients of the current block to inverse transformer 114. The determined scanning order may be predetermined.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116.

Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
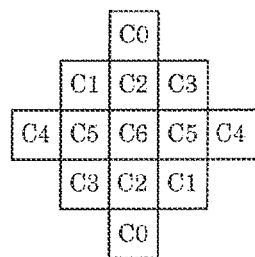
FIG. 4A illustrates one example of a filter shape used in ALF.
Figure 4B:
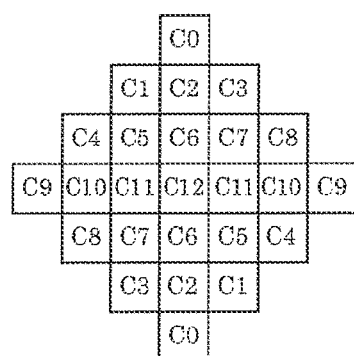
FIG. 4B illustrates another example of a filter shape used in ALF.
Figure 4C:
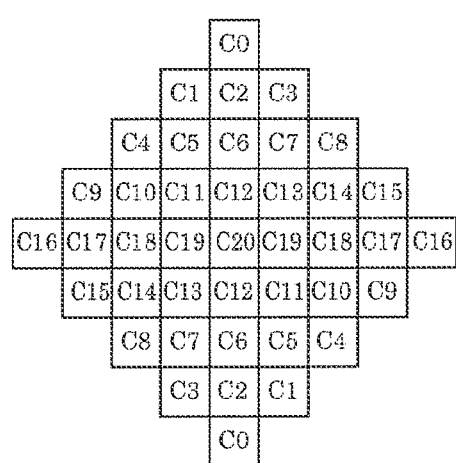
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see NPL 1).

Figure 5A:
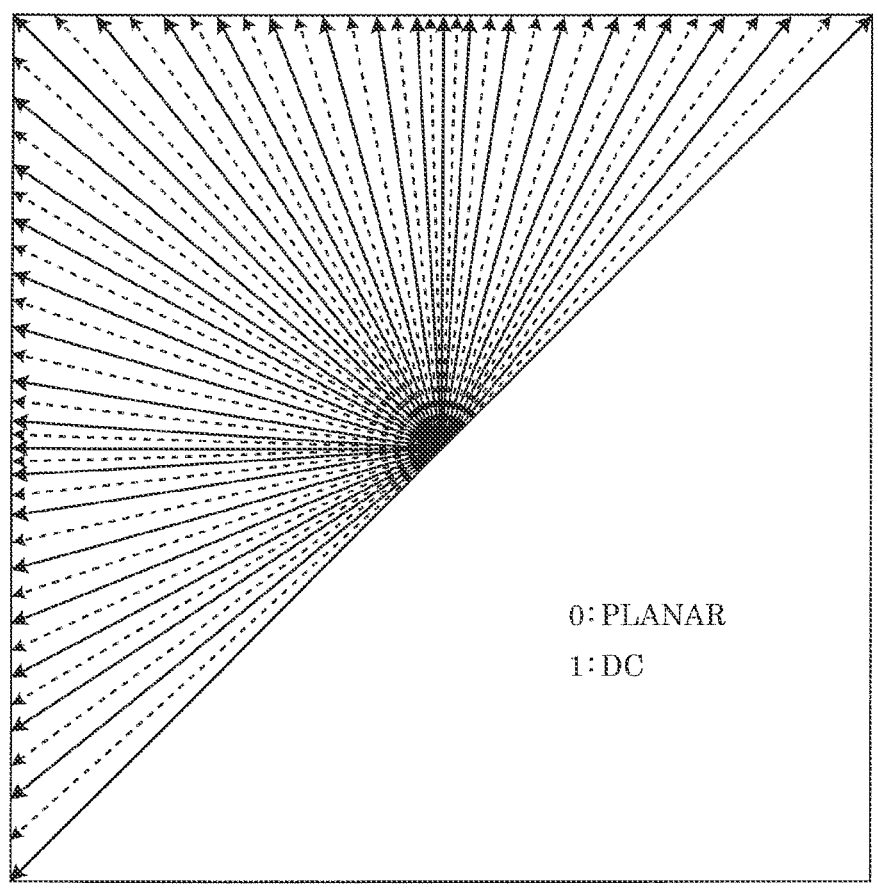
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4×4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
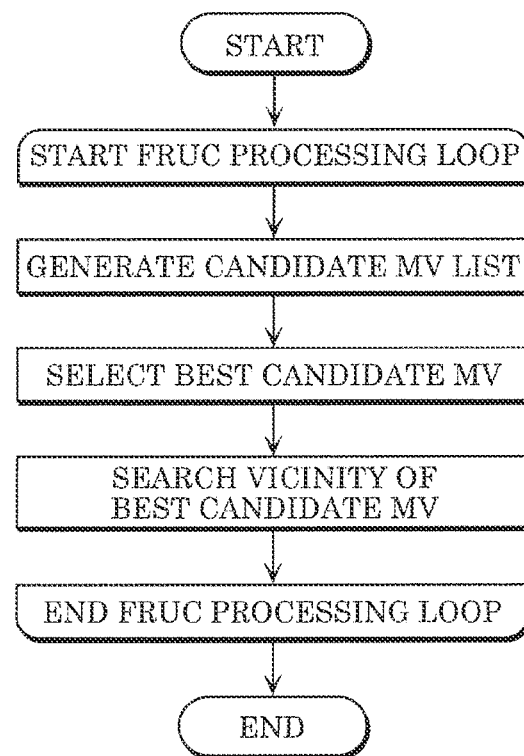
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a determined region. Note that the evaluation value may be calculated by using some other information in addition to the difference. The determined region may be predetermined.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the determined region for the above-described calculation of the candidate evaluation value.

Figure 6:
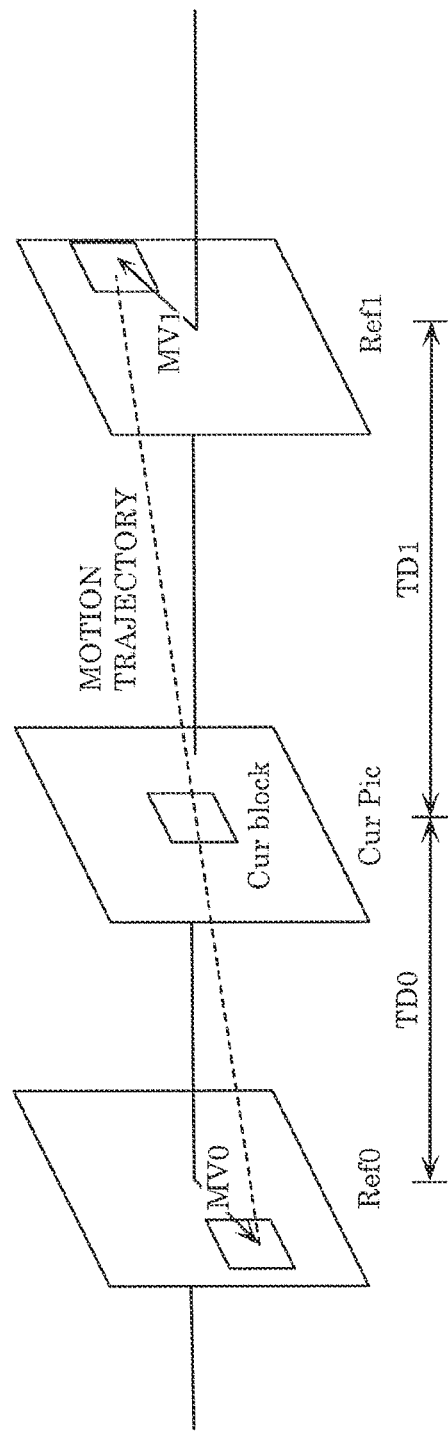
FIG. 6 is for illustrating pattern matching (bilateral matching) between two blocks along a motion trajectory.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the determined region for the above-described calculation of the candidate evaluation value.

Figure 7:
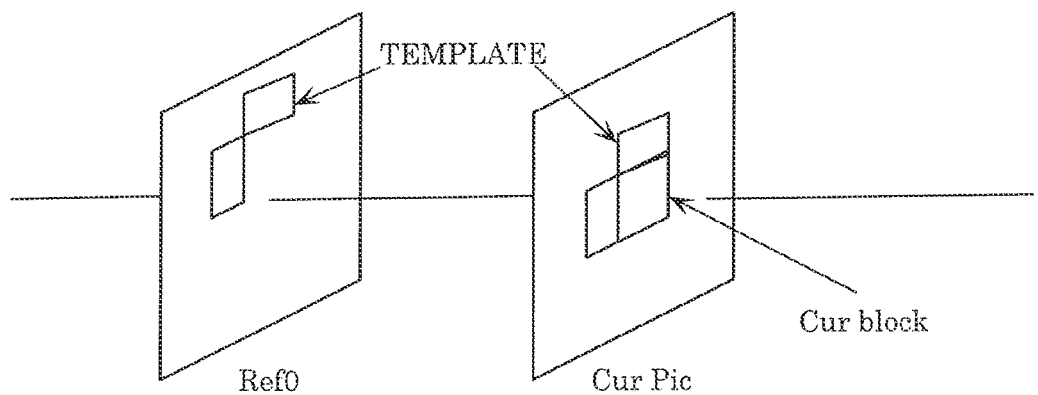
FIG. 7 is for illustrating pattern matching (template matching) between a template in the current picture and a block in a reference picture.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
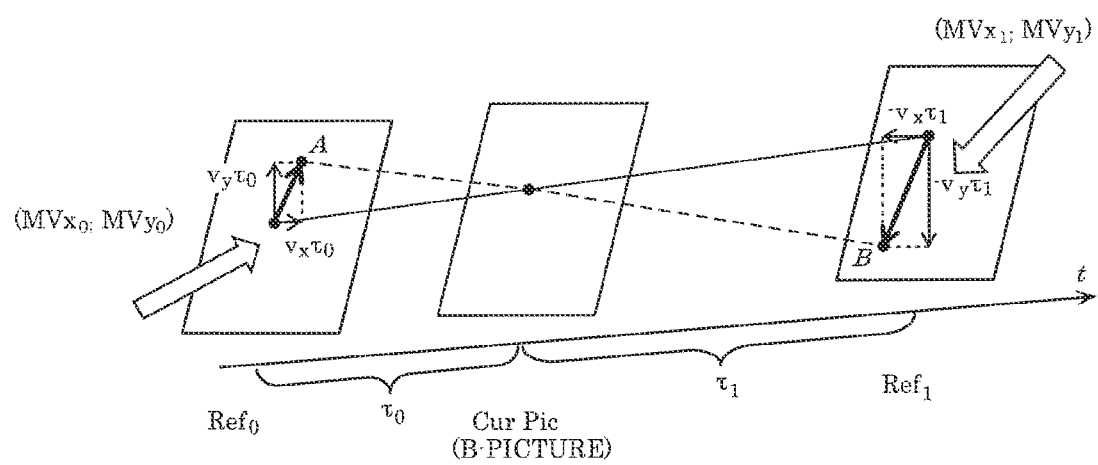
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
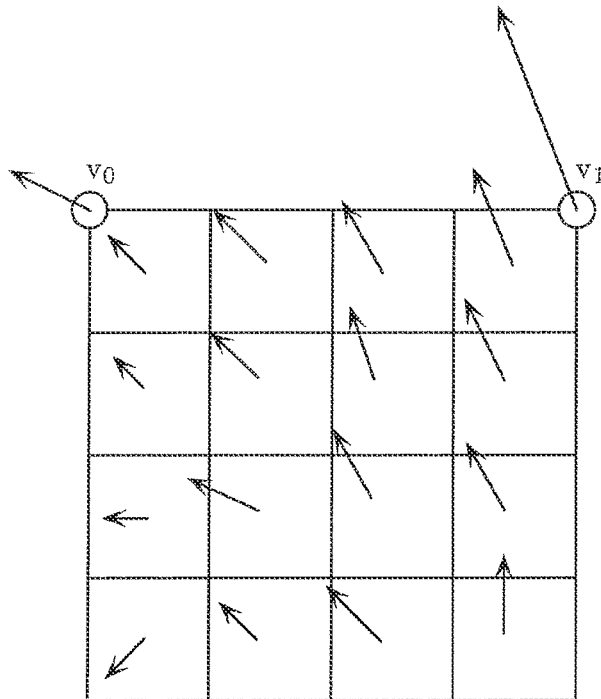
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w}x - \frac{(v_{1y} - v_{0y})}{w}y + v_{0x} \\ v_y = \frac{(v_{1y} - v_{0y})}{w}x + \frac{(v_{1x} - v_{0x})}{w}y + v_{0y} \end{cases} \quad (2)$$

Here, x and y are the horizontal and vertical positions of the sub-block, respectively, and w is a determined weighted coefficient. The determined weighted coefficient may be predetermined.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Figure 9B:
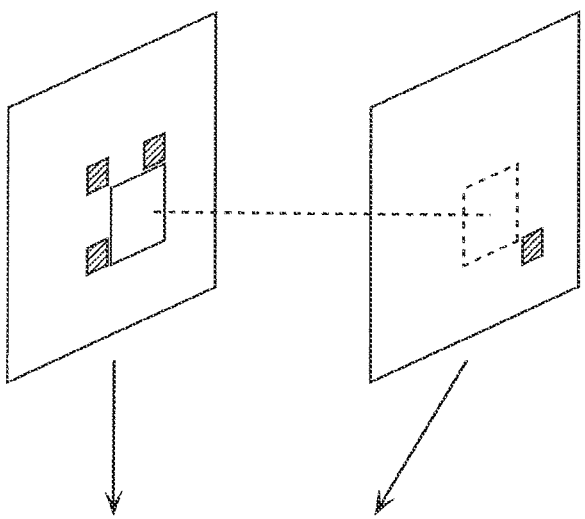
FIG. 9B is for illustrating an outline of a process for deriving a motion vector via merge mode.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

Figure 9C:
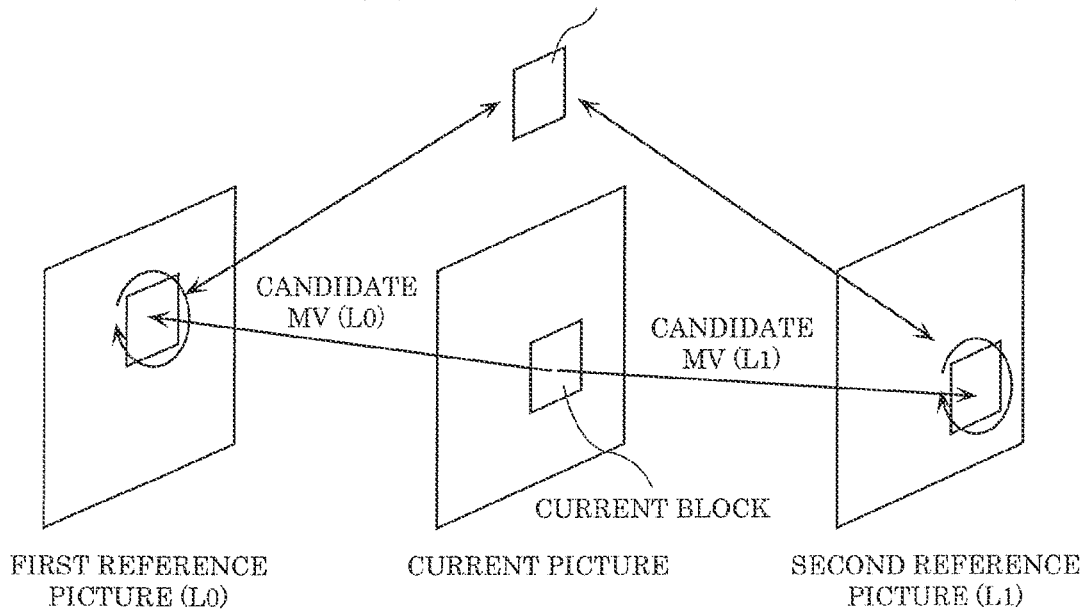
FIG. 9C is a conceptual diagram for illustrating an outline of DMVR processing.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
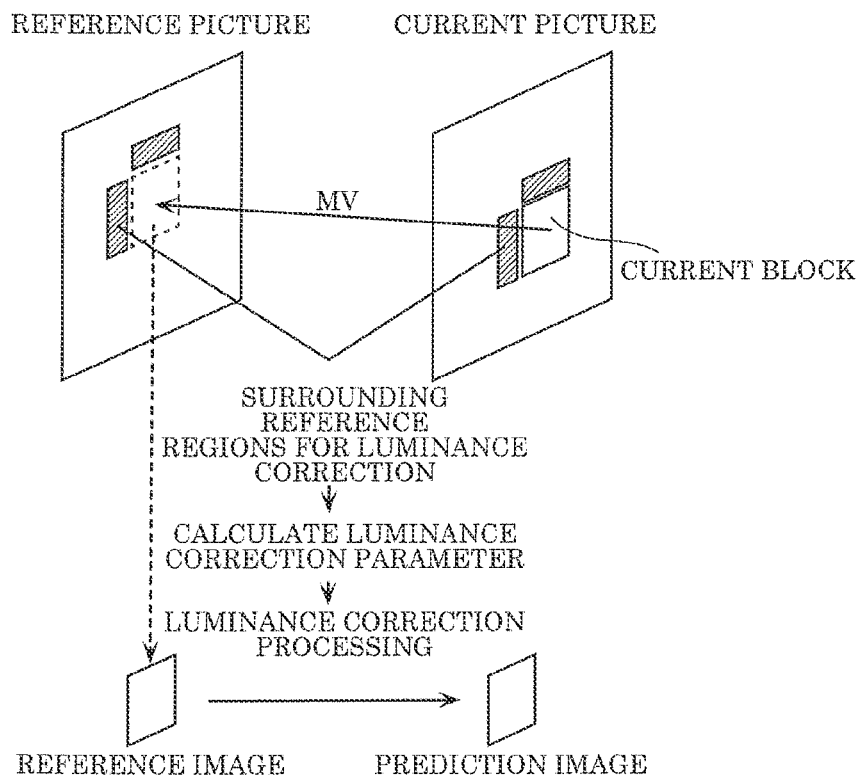
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
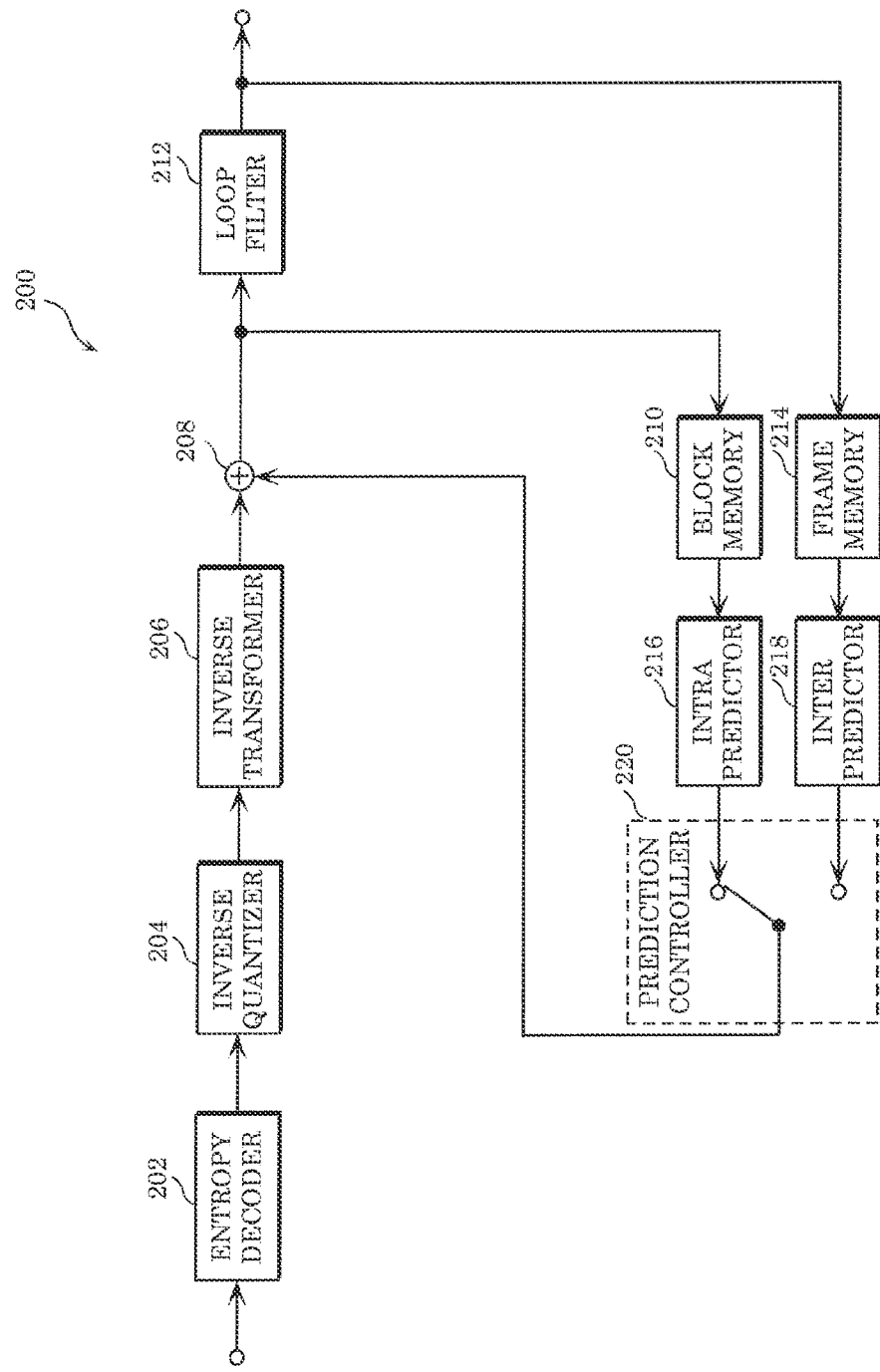
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

[First Aspect of Encoding and Decoding]

Figure 11:
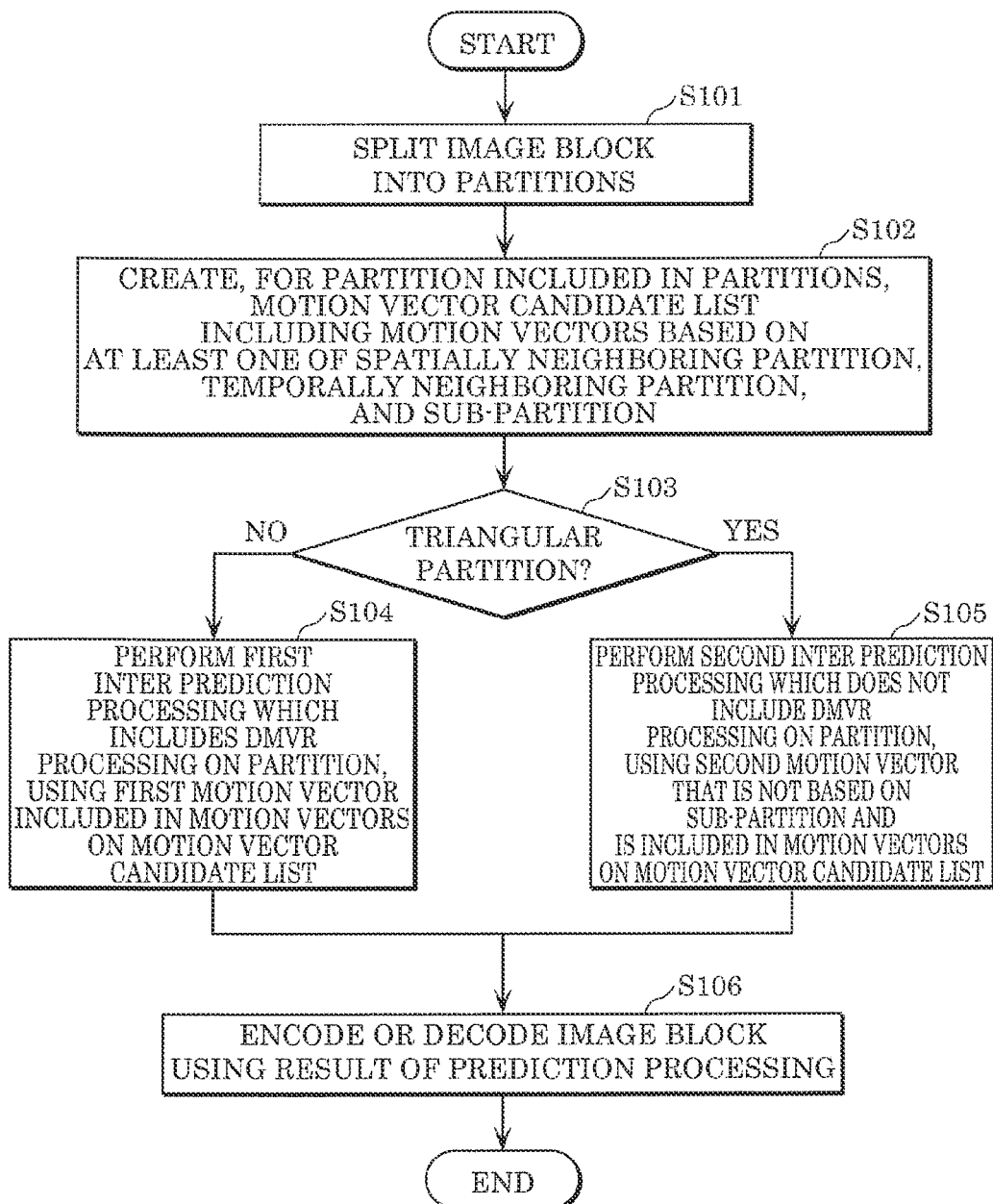
FIG. 11 is a flow chart illustrating encoding processing and decoding processing for an image block according to a first aspect of Embodiment 1.
Figure 12A:
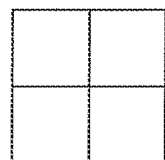
FIG. 12A is a schematic diagram illustrating splitting of the image block into four partitions according to Embodiment 1.
Figure 12B:
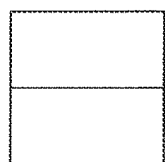
FIG. 12B is a schematic diagram illustrating a first example of splitting the image block into two partitions according to Embodiment 1.
Figure 12C:
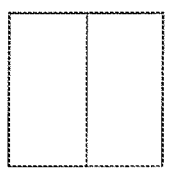
FIG. 12C is a schematic diagram illustrating a second example of splitting the image block into two partitions according to Embodiment 1.
Figure 12D:
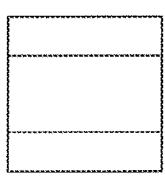
FIG. 12D is a schematic diagram illustrating a first example of splitting the image block into three partitions according to Embodiment 1.
Figure 12E:
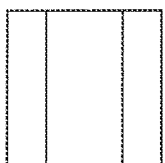
FIG. 12E is a schematic diagram illustrating a second example of splitting the image block into three partitions according to Embodiment 1.
Figure 12F:
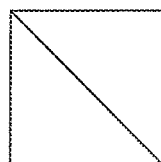
FIG. 12F is a schematic diagram illustrating a first example of obliquely splitting the image block according to Embodiment 1.
Figure 12G:
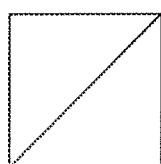
FIG. 12G is a schematic diagram illustrating a second example of obliquely splitting the image block according to Embodiment 1.
Figure 12H:
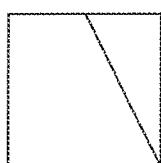
FIG. 12H is a schematic diagram illustrating a third example of obliquely splitting the image block according to Embodiment 1.
Figure 12I:
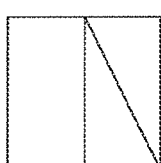
FIG. 12I is a schematic diagram illustrating a first example of a combined way of splitting the image block according to Embodiment 1.
Figure 12J:
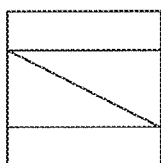
FIG. 12J is a schematic diagram illustrating a second example of a combined way of splitting the image block according to Embodiment 1.
Figure 13A:
FIG. 13A is a schematic diagram illustrating a triangular partition according to Embodiment 1.
Figure 13B:
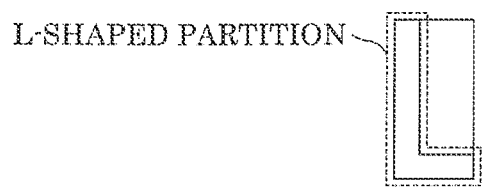
FIG. 13B is a schematic diagram illustrating an L-shape partition according to Embodiment 1.
Figure 13C:
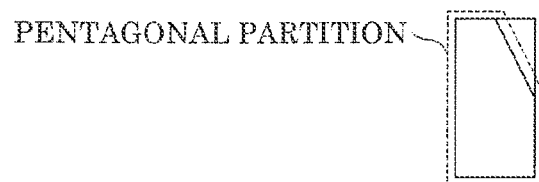
FIG. 13C is a schematic diagram illustrating a pentagonal partition according to Embodiment 1.
Figure 13D:
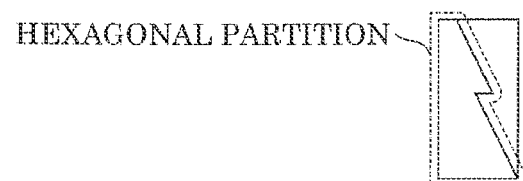
FIG. 13D is a schematic diagram illustrating a hexagonal partition according to Embodiment 1.
Figure 13E:
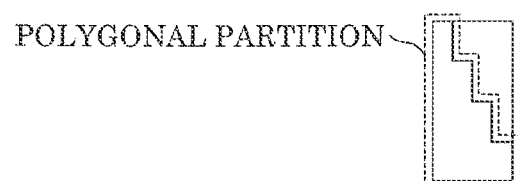
FIG. 13E is a schematic diagram illustrating a polygonal partition according to Embodiment 1.

FIG. 11 illustrates an encoding method and encoding processing performed by encoder 100 according to a first aspect. Note that a decoding method and decoding processing performed by decoder 200 are essentially the same as the encoding method and encoding processing performed by encoder 100. In the following description, "encode" or "encoding" in the encoding method and encoding processing can be replaced with "decode" or "decoding" in the decoding method and decoding processing.

First, encoder 100 splits an image block into a plurality of partitions (S101).

The image block may be split into four partitions, two partitions, or three partitions, or may be split obliquely, as illustrated in FIG. 12A, FIG. 12B, FIG. 12C, FIG. 12D, FIG. 12E, FIG. 12F, FIG. 12G, FIG. 12H, FIG. 12I, and FIG. 12J. The way in which the image block is split is not limited to those illustrated, and the illustrated ways of partitioning may be freely combined.

Moreover, the partitions may be such partitions as those illustrated in FIG. 13A, FIG. 13B, FIG. 13C, FIG. 13D, and FIG. 13E. Specifically, a partition may be a rectangular partition, a non-rectangular partition, a triangular partition, an L-shape partition, a pentagonal partition, a hexagonal partition, or a polygonal partition.

Next, encoder 100 creates a motion vector candidate list for a partition included in a plurality of partitions (S102). The motion vector candidate list may include at least one motion vector among a plurality of motion vectors for a plurality of spatially neighboring partitions, a plurality of motion vectors for a plurality of temporally neighboring partitions, and a plurality of motion vectors for a plurality of sub-partitions.

A spatially neighboring partition is a partition that spatially neighbors the partition. The spatially neighboring partition may be a partition located at the top, left, right, bottom, top-left, top-right, bottom-left, or bottom-right of the partition.

A temporally neighboring partition is a partition that temporally neighbors the partition. The temporally neighboring partition may be a co-located partition which, in a reference picture of the partition, corresponds to the position of the partition. The reference picture is a picture different from the current picture including the partition, and may be a picture immediately before or immediately after the current picture. For example, the spatial position of the co-located partition is the same as the position of the partition in the current picture. Alternatively, the spatial position, in the reference picture, of the temporally neighboring partition may be different from the spatial position, in the current picture, of the partition.

The plurality of motion vectors for the plurality of sub-partitions include motion vectors predicted from motion vectors for sub-partitions which spatially or temporally neighbor the plurality of sub-partitions, and are obtained through sub-CU based motion vector prediction processing. The sub-CU based motion vector prediction processing may be advanced temporal motion vector prediction (ATMVP), or may be spatial-temporal motion vector prediction (STMVP).

Figure 14:
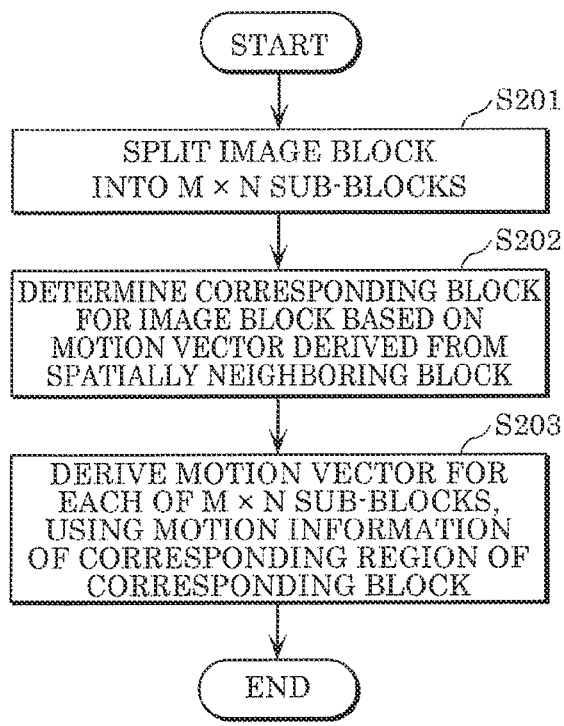
FIG. 14 is a flow chart illustrating ATMVP processing according to Embodiment 1.

FIG. 14 illustrates an example of ATMVP processing. First, encoder 100 splits an image block into a plurality of M×N sub-blocks (S201). Essentially, M and N are smaller than the width and the height of the image block, respectively. M may be equal to N, but need not be equal to N. For example, M and N correspond to the horizontal pixel count of the image block and the vertical pixel count of the image block, respectively.

Specifically, M may be 4. M may be one eighth of the width of the image block, or may be one Kth of the width of the image block, where K is a positive integer. Likewise, N may be 4. N may be one eighth of the height of the image block, or may be one Kth of the height of the image block, where K is a positive integer.

Figure 15:
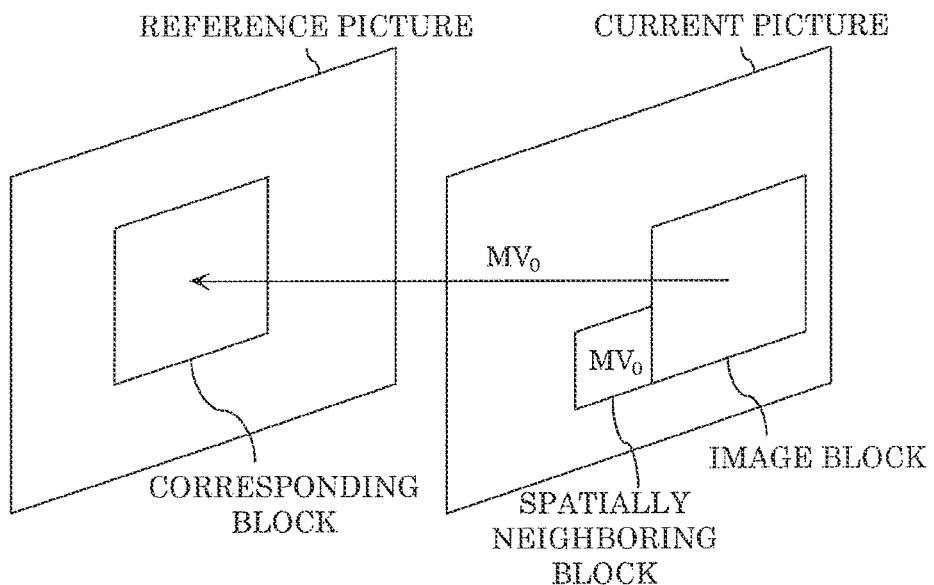
FIG. 15 is a conceptual diagram illustrating processing for determining a corresponding block in the ATMVP processing.
Figure 16:
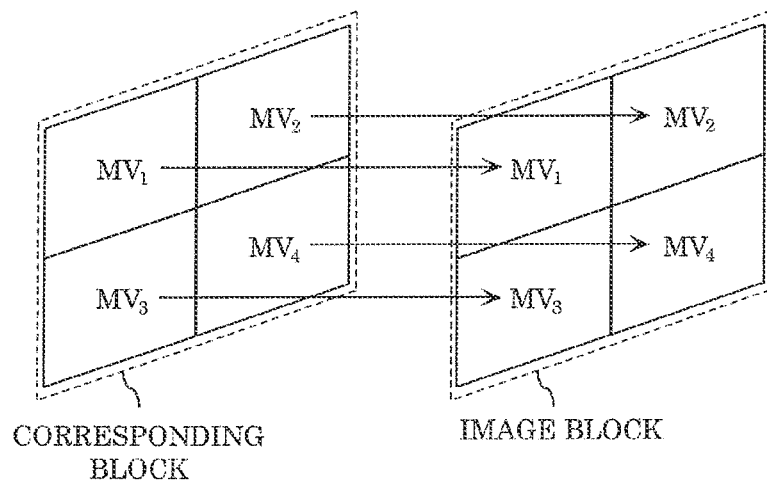
FIG. 16 is a conceptual diagram illustrating processing for deriving a motion vector for a sub-block in the ATMVP processing.

Encoder 100 determines a corresponding block for the image block (S202). As illustrated in FIG. 15, the corresponding block is pointed by a motion vector derived from a spatially neighboring block of the image block. As illustrated in FIG. 16, encoder 100 then derives a motion vector for each of M×N sub-blocks based on motion information of the corresponding block (S203).

Figure 17:
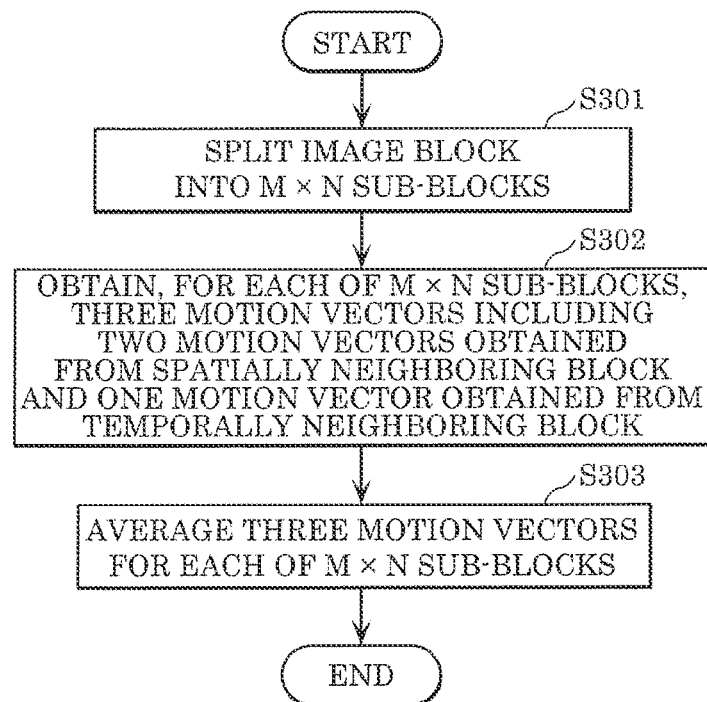
FIG. 17 is a flow chart illustrating STMVP processing according to Embodiment 1.

FIG. 17 illustrates an example of STMVP processing. First, encoder 100 splits an image block into a plurality of M×N sub-blocks (S301). Essentially, M and N are smaller than the width and the height of the image block, respectively. M may be equal to N, but need not be equal to N. For example, M and N correspond to the horizontal pixel count of the image block and the vertical pixel count of the image block, respectively.

Specifically, M may be 4. M may be one eighth of the width of the image block, or may be one Kth of the width of the image block, where K is a positive integer. Likewise, N may be 4. N may be one eighth of the height of the image block, or may be one Kth of the height of the image block, where K is a positive integer.

Encoder 100 obtains three motion vectors for each of M×N sub-blocks (S302). Two of the three motion vectors are obtained from a spatially neighboring block of the M×N sub-block, whereas one of the three motion vectors is obtained from a temporally neighboring block of the M×N sub-block. Encoder 100 derives, for each of the M×N sub-blocks, a motion vector obtained by averaging these three motion vectors (S303).

For example, the motion vector candidate list for the partition is the same as the motion vector candidate list created for the image block in a determined prediction mode such as a merge mode or an inter prediction mode. The determined prediction mode may be predetermined.

Encoder 100 determines whether the partition is a triangular partition (S103). When the partition is not a triangular partition (NO at S103), encoder 100 performs a first method (S104). When the partition is a triangular partition (YES at S103), encoder 100 performs a second method (S105).

In the first method, encoder 100 performs first inter prediction processing on the partition using a first motion vector included in the motion vector candidate list (S104). For example, the first inter prediction processing includes motion compensation processing, decoder-side motion vector refinement (DMVR) processing, and bi-directional optical flow (BIO) processing.

When the DMVR processing is to be performed, encoder 100 obtains a prediction image for the partition using the motion vector for the partition. Encoder 100 then obtains a new motion vector for the partition by, for example, performing motion estimation using the prediction image for the partition. Encoder 100 then obtains, as a final prediction image for the partition, a new prediction image for the partition using the new motion vector for the partition.

When the DMVR processing is not to be performed, encoder 100 obtains a final prediction image for the partition using a normal motion vector for the partition, without using a new motion vector for the partition. For example, the normal motion vector may be a motion vector selected from the motion vector candidate list.

FIG. 18 illustrates an example of the DMVR processing. Encoder 100 determines whether the image block has two motion vectors including a first motion vector and a second motion vector (S401). For example, when the image block does not have two motion vectors including the first motion vector and the second motion vector, encoder 100 derives a prediction block using one motion vector, and encodes the image block using the prediction block derived.

On the other hand, when the image block has two motion vectors including the first motion vector and the second motion vector, encoder 100 derives a first prediction block and a second prediction block using the first motion vector and the second motion vector.

For example, the first motion vector points to the first reference picture, and the second motion vector points to the second reference picture. In such a case, encoder 100 predicts a first prediction block using the first motion vector and the first reference picture, and predicts a second prediction block using the second motion vector and the second reference picture (S402).

Next, encoder 100 performs weighting processing on the first prediction block and the second prediction block, so as to derive a template block as the result of the weighting processing (S403). Here, the weighting processing is, for example, weighted averaging or weighted addition.

Next, encoder 100 derives a third motion vector by performing motion estimation processing using the template block and the first reference picture. Similarly, encoder 100 derives a fourth motion vector by performing motion estimation processing using the template block and the second reference picture (S404). Here, the motion estimation processing is processing of estimating a motion vector by estimating a similar block using block matching, for example.

Next, encoder 100 predicts a third prediction block using the third motion vector and the first reference picture. Similarly, encoder 100 predicts a fourth prediction block using the fourth motion vector and the second reference picture (S405).

Next, encoder 100 performs the weighting processing on the third prediction block and the fourth prediction block (S406).

The DMVR processing is performed in the above described manner. Then, for example, encoder 100 encodes the image block using the result of the weighting processing (S407).

The DMVR processing is not limited to the above-described processing; it is sufficient so long as it is processing of determining a final motion vector by performing motion estimation based on a determined motion vector and an encoded reference picture. For example, a final motion vector may be estimated by performing cost evaluation using a difference value between the first prediction block and the second prediction block, without creating the template block.

As described earlier, when the partition is a triangular partition, encoder 100 performs the second method (S105). In the second method, encoder 100 performs second inter prediction processing on the partition using the second motion vector included in the motion vector candidate list.

For example, the second motion vector is different from the motion vectors for the sub-partitions. That is to say, the second motion vector is different from the motion vectors derived through the sub-CU based motion vector prediction processing. The second inter prediction processing includes motion compensation processing, and does not include the DMVR processing. The second inter prediction processing may include motion compensation processing and BIO processing, and need not include the DMVR processing.

Lastly, encoder 100 encodes the image block using the result of the inter prediction processing performed on the partition (S106). For example, encoder 100 performs the inter prediction processing, and obtains a prediction image as the result of the inter prediction processing. Encoder 100 then encodes the image block using the prediction image.

Encoder 100 performs the above-described processing (S102 to S105) on each of the plurality of partitions, and may encode the image block using a plurality of results of the inter prediction processing performed on the plurality of partitions.

Encoder 100 may encode a flag which indicates whether the image block is to be split into a plurality of partitions including a triangular partition. This flag is also referred to as a split parameter. For example, when the flag is 1, it indicates that the image block is to be split into a plurality of partitions including a triangular partition, whereas when the flag is 0, it indicates that the image block is not to be split into a plurality of partitions including a triangular partition.

The above flag may be a triangle flag indicating whether the mode is a triangle mode in which the image block is split into a plurality of partitions including a triangular partition, a motion vector is derived for each partition, and motion compensation is performed for each partition.

For example, in the triangle mode, the image block is split into a plurality of triangular partitions. Then, a candidate motion vector list is generated for each triangular partition. Then, for each triangular partition, motion compensation processing is performed using a motion vector predicted from the candidate motion vector list. Then, prediction processing for the image block is performed by combining a plurality of prediction images of the plurality of triangular partitions. Then, the image block is encoded based on the result of the prediction processing.

The above flag may be encoded by the same flag as a flag related to a different prediction mode. For example, when the flag is a first value, it may indicate that the image block is to be encoded in the merge mode, whereas when the flag is a second value different from the first value, it may indicate that the image block is to be encoded in the triangle mode. The flag may indicate a method for splitting the image block.

When the flag indicates that the image block is to be split into a plurality of partitions including a triangular partition, encoder 100 encodes the image block after splitting the image block into a plurality of partitions including a triangular partition.

On the other hand, when the flag indicates that the image block is not to be split into a plurality of partitions including a triangular partition, encoder 100 encodes the image block without splitting the image block into a plurality of partitions including a triangular partition. In such a case, encoder 100 may encode the image block without splitting the image block, or may encode the image block after splitting the image block into a plurality of rectangular partitions.

As illustrated in FIG. 19, encoder 100 may encode the above flag based on a determination result. In this example, encoder 100 first obtains a parameter of the image block (S501). The parameter of the image block may be at least one of the width of the image block, the height of the image block, or a ratio of the width to the height of the image block. This parameter is also referred to as a size parameter.

Next, encoder 100 determines whether the parameter is greater than or equal to a first threshold and less than or equal to a second threshold (S502). When the parameter is greater than or equal to the first threshold and less than or equal to the second threshold (YES at S502), encoder 100 encodes the image block with a flag (S503). The first threshold is less than or equal to the second threshold. Essentially, the first threshold and the second threshold are greater than or equal to 0.

When the parameter is not greater than or equal to the first threshold and less than or equal to the second threshold (NO at S502), that is, when the parameter is less than the first threshold or greater than the second threshold, encoder 100 encodes the image block without a flag (S504). Alternatively, when the parameter is not greater than or equal to the first threshold and less than or equal to the second threshold, encoder 100 may encode the image block with a flag indicating that the image block is not to be split into a plurality of partitions including a triangular partition.

The first threshold may be the reciprocal of the second threshold. The first threshold may be a positive integer or a positive fraction. The second threshold may also be a positive integer or a positive fraction.

For example, the parameter is a ratio of the width to the height of the image block. The first threshold is the reciprocal of the second threshold. When the ratio of the width to the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When both the width and the height of the image block are greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When at least one of the width or the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is a ratio of the width to the height of the image block. Each of the four thresholds is a positive integer. The first threshold is less than or equal to the second threshold. The third threshold is the reciprocal of the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is the height of the image block. Each of the four thresholds is a positive integer. The first threshold is less than or equal to the second threshold. The third threshold is less than or equal to the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, three parameters including a first parameter, a second parameter, and a third parameter, and four thresholds including a first threshold, a second threshold, a third threshold, and a fourth threshold are used. The first parameter is the width of the image block, the second parameter is the height of the image block, and the third parameter is a ratio of the width to the height of the image block. Each of the four thresholds is a positive integer. The first threshold is less than or equal to the second threshold. The third threshold is the reciprocal of the fourth threshold.

When both the first parameter and the second parameter are greater than or equal to the first threshold and less than or equal to the second threshold, and the third parameter is greater than or equal to the third threshold and less than or equal to the fourth threshold, encoder 100 encodes the image block with a flag (S503). Otherwise, encoder 100 encodes the image block without a flag (S504).

As illustrated in FIG. 20, encoder 100 may encode the above flag based on a determination result. In this example, encoder 100 first obtains a parameter of the image block (S601). The parameter of the image block may be at least one of the width of the image block, the height of the image block, or a ratio of the width to the height of the image block. This parameter is also referred to as a size parameter.

Next, encoder 100 determines whether the parameter is greater than or equal to a threshold (S602). When the parameter is greater than or equal to the threshold (YES at S602), encoder 100 encodes the image block with a flag (S603). Essentially, the threshold is greater than or equal to 0.

When the parameter is not greater than or equal to the threshold (NO at S602), that is, when the parameter is less than the threshold, encoder 100 encodes the image block without a flag (S604). Alternatively, when the parameter is not greater than or equal to the threshold, encoder 100 may encode the image block with a flag indicating that the image block is not to be split into a plurality of partitions including a triangular partition.

For example, two parameters including a first parameter and a second parameter are used. The first parameter is the width of the image block, and the second parameter is the height of the image block. The threshold is a positive integer. When both the width and the height of the image block are greater than or equal to the threshold, encoder 100 encodes the image block with a flag (S603). Otherwise, encoder 100 encodes the image block without a flag (S604).

For example, two parameters including a first parameter and a second parameter are used. The first parameter is the width of the image block, and the second parameter is the height of the image block. The threshold is a positive integer. When at least one of the width or the height of the image block is greater than or equal to the threshold, encoder 100 encodes the image block with a flag (S603). Otherwise, encoder 100 encodes the image block without a flag (S604).

For example, the parameter is the width of the image block. The threshold is a positive integer. When the width of the image block is greater than or equal to the threshold, encoder 100 encodes the image block with a flag (S603). Otherwise, encoder 100 encodes the image block without a flag (S604). When encoding the image block without a flag, encoder 100 may encode the image block without splitting the image block, or may encode the image block after splitting the image block into a plurality of rectangular partitions.

In the present aspect, inter prediction processing for triangular partitions is simplified. Accordingly, software and hardware complexity is reduced.

[Second Aspect of Encoding and Decoding]

Figure 21:
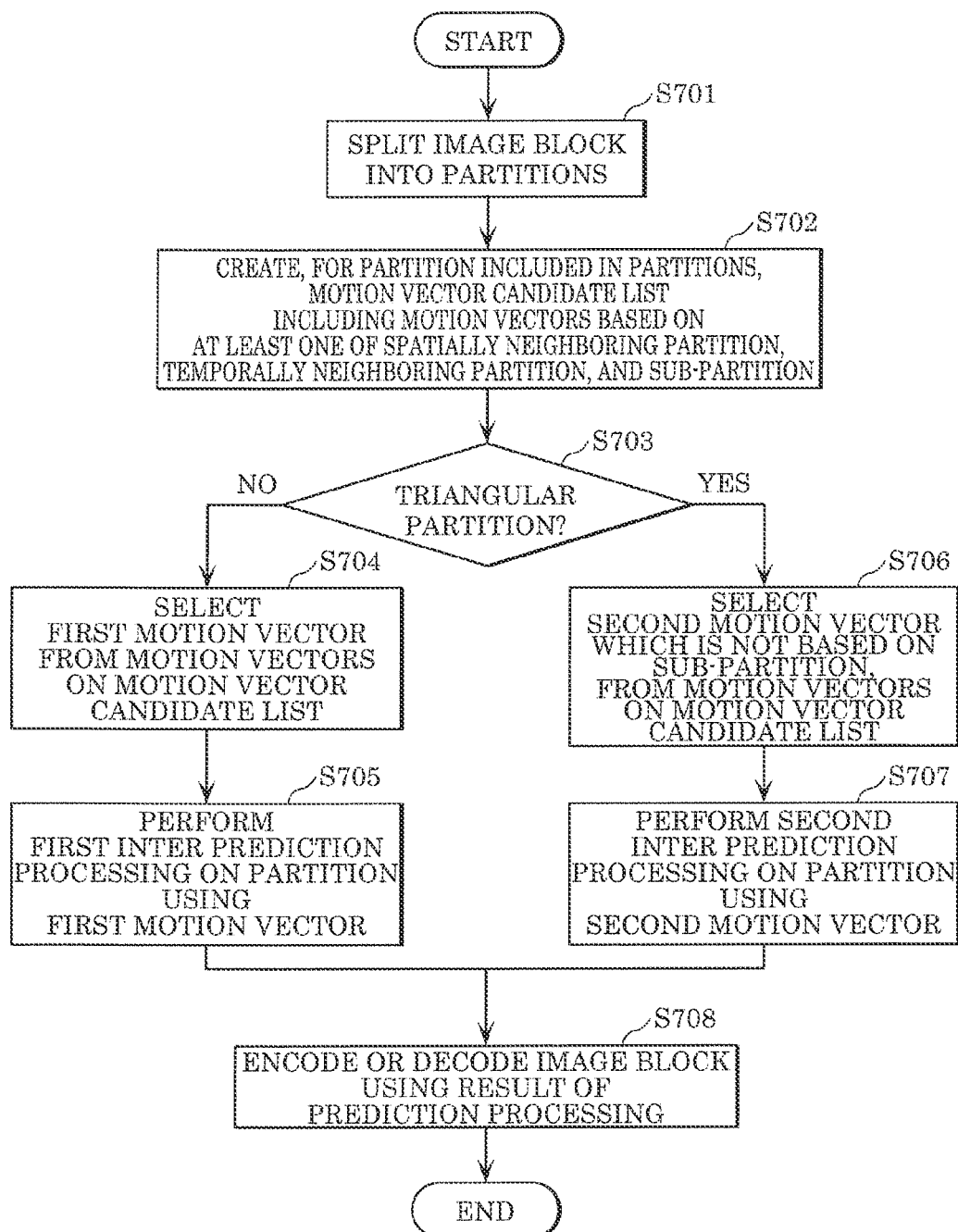
FIG. 21 is a flow chart illustrating encoding processing and decoding processing for an image block according to a second aspect of Embodiment 1.

FIG. 21 illustrates an encoding method and encoding processing performed by encoder 100 according to a second aspect. Note that a decoding method and decoding processing performed by decoder 200 are essentially the same as the encoding method and encoding processing performed by encoder 100. In the following description, "encode" or "encoding" in the encoding method and encoding processing can be replaced with "decode" or "decoding" in the decoding method and decoding processing.

First, encoder 100 splits an image block into a plurality of partitions (S701).

The image block may be split into four partitions, two partitions, or three partitions, or may be split obliquely, as illustrated in FIG. 12A, FIG. 12B, FIG. 12C, FIG. 12D, FIG. 12E, FIG. 12F, FIG. 12G, FIG. 12H, FIG. 12I, and FIG. 12J. The way in which the image block is split is not limited to those illustrated, and the illustrated ways of partitioning may be freely combined.

Moreover, the partitions may be such partitions as those illustrated in FIG. 13A, FIG. 13B, FIG. 13C, FIG. 13D, and FIG. 13E. Specifically, a partition may be a rectangular partition, a non-rectangular partition, a triangular partition, an L-shape partition, a pentagonal partition, a hexagonal partition, or a polygonal partition.

Next, encoder 100 creates a motion vector candidate list for a partition included in a plurality of partitions (S702).

The motion vector candidate list may include at least one motion vector among a plurality of motion vectors for a plurality of spatially neighboring partitions, a plurality of motion vectors for a plurality of temporally neighboring partitions, and a plurality of motion vectors for a plurality of sub-partitions.

A spatially neighboring partition is a partition that spatially neighbors the partition. The spatially neighboring partition may be a partition located at the top, left, right, bottom, top-left, top-right, bottom-left, or bottom-right of the partition.

A temporally neighboring partition is a partition that temporally neighbors the partition. The temporally neighboring partition may be a co-located partition which, in a reference picture of the partition, is located in a position that corresponds to the position of the partition. The reference picture is a picture different from the current picture including the partition, and may be a picture immediately before or immediately after the current picture. For example, the spatial position of the co-located partition is the same as the position of the partition in the current picture.

The plurality of motion vectors for the plurality of sub-partitions include motion vectors predicted from motion vectors for sub-partitions which spatially or temporally neighbor the plurality of sub-partitions, and are obtained through sub-CU based motion vector prediction processing. The sub-CU based motion vector prediction processing may be ATMVP, or may be STMVP.

For example, the motion vector candidate list for the partition is the same as the motion vector candidate list created for the image block in a determined prediction mode such as a merge mode or an inter prediction mode. The determined prediction mode may be predetermined.

Encoder 100 determines whether the partition is a triangular partition (S703). When the partition is not a triangular partition (NO at S703), encoder 100 performs a first method (S704 and S705). When the partition is a triangular partition (YES at S703), encoder 100 performs a second method (S706 and S707).

In the first method, encoder 100 selects a first motion vector for the partition from the motion vector candidate list (S704). Encoder 100 then performs first inter prediction processing on the partition using the first motion vector (S705). The first inter prediction processing includes motion compensation processing.

For example, the first inter prediction processing may include OBMC processing. Alternatively, the first inter prediction processing may include DMVR processing, BIO processing, and OBMC processing.

In the second method, encoder 100 selects, for the partition, a second motion vector which is not based on a sub-partition, from the motion vector candidate list (S706). For example, the second motion vector which is not based on a sub-partition is a motion vector that is not derived from the sub-CU based motion vector prediction processing. Encoder 100 then performs second inter prediction processing on the partition using the second motion vector (S707). The second inter prediction processing includes motion compensation processing.

For example, the second inter prediction processing is the same as the first inter prediction processing. Alternatively, the second inter prediction processing may include BIO processing, and need not include the DMVR processing.

Lastly, encoder 100 encodes the image block using the result of inter prediction processing performed on the partition (S708). For example, encoder 100 performs the inter prediction processing, and obtains a prediction image as the result of the inter prediction processing. Encoder 100 then encodes the image block using the prediction image.

Encoder 100 performs the above-described processing (S702 to S707) on each of the plurality of partitions, and may encode the image block using a plurality of results of the inter prediction processing performed on the plurality of partitions.

Encoder 100 may encode a flag which indicates whether the image block is to be split into a plurality of partitions including a triangular partition. This flag is also referred to as a split parameter. For example, when the flag is 1, it indicates that the image block is to be split into a plurality of partitions including a triangular partition, whereas when the flag is 0, it indicates that the image block is not to be split into a plurality of partitions including a triangular partition.

When the flag indicates that the image block is to be split into a plurality of partitions including a triangular partition, encoder 100 encodes the image block after splitting the image block into a plurality of partitions including a triangular partition.

On the other hand, when the flag indicates that the image block is not to be split into a plurality of partitions including a triangular partition, encoder 100 encodes the image block without splitting the image block into a plurality of partitions including a triangular partition. In this case, encoder 100 may encode the image block without splitting the image block, or may encode the image block after splitting the image block into a plurality of rectangular partitions.

As illustrated in FIG. 19, encoder 100 may encode the above flag based on a determination result. In this example, encoder 100 first obtains a parameter of the image block (S501). The parameter of the image block may be at least one of the width of the image block, the height of the image block, or a ratio of the width to the height of the image block. This parameter is also referred to as a size parameter.

Next, encoder 100 determines whether the parameter is greater than or equal to a first threshold and less than or equal to a second threshold (S502). When the parameter is greater than or equal to the first threshold and less than or equal to the second threshold (YES at S502), encoder 100 encodes the image block with a flag (S503). The first threshold is less than or equal to the second threshold. Essentially, the first threshold and the second threshold are greater than or equal to 0.

When the parameter is not greater than or equal to the first threshold and less than or equal to the second threshold (NO at S502), that is, when the parameter is less than the first threshold or greater than the second threshold, encoder 100 encodes the image block without a flag (S504). Alternatively, when the parameter is not greater than or equal to the first threshold and less than or equal to the second threshold, encoder 100 may encode the image block with a flag indicating that the image block is not to be split into a plurality of partitions including a triangular partition.

The first threshold may be the reciprocal of the second threshold. The first threshold may be a positive integer or a positive fraction. The second threshold may also be a positive integer or a positive fraction.

For example, the parameter is a ratio of the width to the height of the image block. The first threshold is the reciprocal of the second threshold. When the ratio of the width to the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When both the width and the height of the image block are greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When at least one of the width or the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is a ratio of the width to the height of the image block. Each of the four thresholds is a positive integer. The first threshold is less than or equal to the second threshold. The third threshold is the reciprocal of the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is the height of the image block. Each of the four thresholds is a positive integer. The first threshold is less than or equal to the second threshold. The third threshold is less than or equal to the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, three parameters including a first parameter, a second parameter, and a third parameter, and four thresholds including a first threshold, a second threshold, a third threshold, and a fourth threshold are used. The first parameter is the width of the image block, the second parameter is the height of the image block, and the third parameter is a ratio of the width to the height of the image block. Each of the four thresholds is a positive integer. The first threshold is less than or equal to the second threshold. The third threshold is the reciprocal of the fourth threshold.

When both the first parameter and the second parameter are greater than or equal to the first threshold and less than or equal to the second threshold, and the third parameter is greater than or equal to the third threshold and less than or equal to the fourth threshold, encoder 100 encodes the image block with a flag (S503). Otherwise, encoder 100 encodes the image block without a flag (S504).

As illustrated in FIG. 20, encoder 100 may encode the above flag based on a determination result. In this example, encoder 100 first obtains a parameter of the image block (S601). The parameter of the image block may be at least one of the width of the image block, the height of the image block, or a ratio of the width to the height of the image block. This parameter is also referred to as a size parameter.

Next, encoder 100 determines whether the parameter is greater than or equal to a threshold (S602). When the parameter is greater than or equal to the threshold (YES at S602), encoder 100 encodes the image block with a flag (S603). Essentially, the threshold is greater than or equal to 0.

When the parameter is not greater than or equal to the threshold (NO at S602), that is, when the parameter is less than the threshold, encoder 100 encodes the image block without a flag (S604). Alternatively, when the parameter is not greater than or equal to the threshold, encoder 100 may encode the image block with a flag indicating that the image block is not to be split into a plurality of partitions including a triangular partition.

For example, two parameters including a first parameter and a second parameter are used. The first parameter is the width of the image block, and the second parameter is the height of the image block. The threshold is a positive integer. When both the width and the height of the image block are greater than or equal to the threshold, encoder 100 encodes the image block with a flag (S603). Otherwise, encoder 100 encodes the image block without a flag (S604).

For example, two parameters including a first parameter and a second parameter are used. The first parameter is the width of the image block, and the second parameter is the height of the image block. The threshold is a positive integer. When at least one of the width or the height of the image block is greater than or equal to the threshold, encoder 100 encodes the image block with a flag (S603). Otherwise, encoder 100 encodes the image block without a flag (S604).

For example, the parameter is the width of the image block. The threshold is a positive integer. When the width of the image block is greater than or equal to the threshold, encoder 100 encodes the image block with a flag (S603). Otherwise, encoder 100 encodes the image block without a flag (S604).

When encoding the image block without a flag, encoder 100 may encode the image block without splitting the image block, or may encode the image block after splitting the image block into a plurality of rectangular partitions.

In the present aspect, motion vector prediction processing for triangular partitions is simplified, thus reducing the operation amount.

Note that encoder 100 may generate the motion vector candidate list after determining whether the partition is a triangular partition. For example, when the partition is not a triangular partition, encoder 100 may generate the motion vector candidate list which includes a sub-partition-based motion vector. When the partition is a triangular partition, encoder 100 may generate the motion vector candidate list which does not include a sub-partition-based motion vector.

Accordingly, when the partition is not a triangular partition, encoder 100 can select a first motion vector from the motion vector candidate list which includes a sub-partition-based motion vector. When the partition is a triangular partition, encoder 100 can select a second motion vector that is not based on a sub-partition, from the motion vector candidate list which does not include a sub-partition-based motion vector.

[Third Aspect of Encoding and Decoding]

Figure 22:
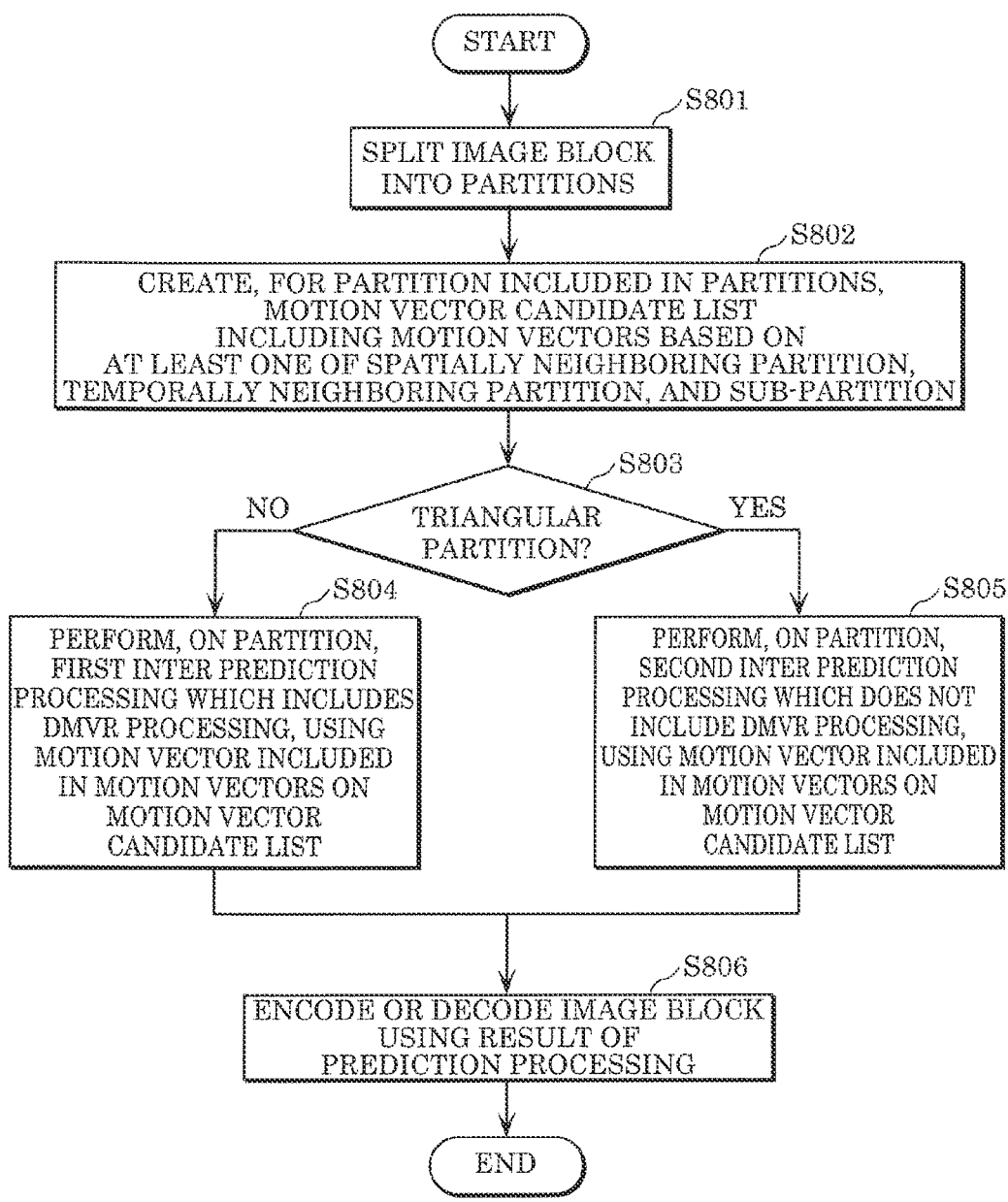
FIG. 22 is a flow chart illustrating encoding processing and decoding processing for an image block according to a third aspect of Embodiment 1.

FIG. 22 illustrates an encoding method and encoding processing performed by encoder 100 according to a third aspect. Note that a decoding method and decoding processing performed by decoder 200 are essentially the same as the encoding method and encoding processing performed by encoder 100. In the following description, "encode" or "encoding" in the encoding method and encoding processing can be replaced with "decode" or "decoding" in the decoding method and decoding processing.

First, encoder 100 splits an image block into a plurality of partitions (S801).

The image block may be split into four partitions, two partitions, or three partitions, or may be split obliquely, as illustrated in FIG. 12A, FIG. 12B, FIG. 12C, FIG. 12D, FIG. 12E, FIG. 12F, FIG. 12G, FIG. 12H, FIG. 12I, and FIG. 12J. The way in which the image block is split is not limited to those illustrated, and the illustrated ways of partitioning may be freely combined.

Moreover, the partitions may be such partitions as those illustrated in FIG. 13A, FIG. 13B, FIG. 13C, FIG. 13D, and FIG. 13E. Specifically, a partition may be a rectangular partition, a non-rectangular partition, a triangular partition, an L-shape partition, a pentagonal partition, a hexagonal partition, or a polygonal partition.

Next, encoder 100 creates a motion vector candidate list for a partition included in a plurality of partitions (S802). The motion vector candidate list may include at least one motion vector among a plurality of motion vectors for a plurality of spatially neighboring partitions, a plurality of motion vectors for a plurality of temporally neighboring partitions, and a plurality of motion vectors for a plurality of sub-partitions.

A spatially neighboring partition is a partition that spatially neighbors the partition. The spatially neighboring partition may be a partition located at the top, left, right, bottom, top-left, top-right, bottom-left, or bottom-right of the partition.

A temporally neighboring partition is a partition that temporally neighbors the partition. The temporally neighboring partition may be a co-located partition which, in a reference picture of the partition, is located in a position that corresponds to the position of the partition. The reference picture is a picture different from the current picture including the partition, and may be a picture immediately before or immediately after the current picture. For example, the spatial position of the co-located partition is the same as the position of the partition in the current picture.

The plurality of motion vectors for the plurality of sub-partitions include motion vectors predicted from motion vectors for sub-partitions which spatially or temporally neighbor the plurality of sub-partitions, and are obtained through sub-CU based motion vector prediction processing. The sub-CU based motion vector prediction processing may be ATMVP, or may be STMVP.

For example, the motion vector candidate list for the partition is the same as the motion vector candidate list created for the image block in a determined prediction mode such as a merge mode or an inter prediction mode. The determined prediction mode may be predetermined.

Encoder 100 determines whether the partition is a triangular partition (S803). When the partition is not a triangular partition (NO at S803), encoder 100 performs a first method (S804). When the partition is a triangular partition (YES at S803), encoder 100 performs a second method (S805).

In the first method, encoder 100 performs first inter prediction processing on the partition using a motion vector included in the motion vector candidate list (S804). For example, the first inter prediction processing includes motion compensation processing and DMVR processing. The first inter prediction processing may include BIO processing, but need not include BIO processing.

For example, a prediction image obtained for the partition using the first method is the same as a portion corresponding to the partition, of a prediction image obtained for the image block without splitting the image block in a determined prediction mode such as a merge mode or an inter prediction mode. The determined prediction mode may be predetermined.

In the second method, encoder 100 performs second inter prediction processing on the partition using a motion vector included in the motion vector candidate list (S805). For example, the second inter prediction processing includes motion compensation processing, and does not include the DMVR processing. The second inter prediction processing may include BIO processing, but need not include BIO processing.

Lastly, encoder 100 encodes the image block using the result of inter prediction processing performed on the partition (S806). For example, encoder 100 performs the inter prediction processing, and obtains a prediction image as the result of the inter prediction processing. Encoder 100 then encodes the image block using the prediction image.

Encoder 100 performs the above-described processing (S802 to S805) on each of the plurality of partitions, and may encode the image block using a plurality of results of the inter prediction processing performed on the plurality of partitions.

Encoder 100 may encode a flag which indicates whether the image block is to be split into a plurality of partitions including a triangular partition. This flag is also referred to as a split parameter. For example, when the flag is 1, it indicates that the image block is to be split into a plurality of partitions including a triangular partition, whereas when the flag is 0, it indicates that the image block is not to be split into a plurality of partitions including a triangular partition.

When the flag indicates that the image block is to be split into a plurality of partitions including a triangular partition, encoder 100 encodes the image block after splitting the image block into a plurality of partitions including a triangular partition.

On the other hand, when the flag indicates that the image block is not to be split into a plurality of partitions including a triangular partition, encoder 100 encodes the image block without splitting the image block into a plurality of partitions including a triangular partition. In this case, encoder 100 may encode the image block without splitting the image block, or may encode the image block after splitting the image block into a plurality of rectangular partitions.

As illustrated in FIG. 19, encoder 100 may encode the above flag based on a determination result. In this example, encoder 100 first obtains a parameter of the image block (S501). The parameter of the image block may be at least one of the width of the image block, the height of the image block, or a ratio of the width to the height of the image block. This parameter is also referred to as a size parameter.

Next, encoder 100 determines whether the parameter is greater than or equal to a first threshold and less than or equal to a second threshold (S502).

When the parameter is greater than or equal to the first threshold and less than or equal to the second threshold (YES at S502), encoder 100 encodes the image block with a flag (S503). The first threshold is less than or equal to the second threshold. Essentially, the first threshold and the second threshold are greater than or equal to 0.

When the parameter is not greater than or equal to the first threshold and less than or equal to the second threshold (NO at S502), that is, when the parameter is less than the first threshold or greater than the second threshold, encoder 100 encodes the image block without a flag (S504). Alternatively, when the parameter is not greater than or equal to the first threshold and less than or equal to the second threshold, encoder 100 may encode the image block with a flag indicating that the image block is not to be split into a plurality of partitions including a triangular partition.

The first threshold may be the reciprocal of the second threshold. The first threshold may be a positive integer or a positive fraction. The second threshold may also be a positive integer or a positive fraction.

For example, the parameter is a ratio of the width to the height of the image block. The first threshold is the reciprocal of the second threshold. When the ratio of the width to the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When both the width and the height of the image block are greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When at least one of the width or the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is a ratio of the width to the height of the image block. Each of the four thresholds is a positive integer. The first threshold is less than or equal to the second threshold. The third threshold is the reciprocal of the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is the height of the image block. Each of the four thresholds is a positive integer. The first threshold is less than or equal to the second threshold. The third threshold is less than or equal to the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, three parameters including a first parameter, a second parameter, and a third parameter, and four thresholds including a first threshold, a second threshold, a third threshold, and a fourth threshold are used. The first parameter is the width of the image block, the second parameter is the height of the image block, and the third parameter is a ratio of the width to the height of the image block. Each of the four thresholds is a positive integer. The first threshold is less than or equal to the second threshold. The third threshold is the reciprocal of the fourth threshold.

When both the first parameter and the second parameter are greater than or equal to the first threshold and less than or equal to the second threshold, and the third parameter is greater than or equal to the third threshold and less than or equal to the fourth threshold, encoder 100 encodes the image block with a flag (S503). Otherwise, encoder 100 encodes the image block without a flag (S504).

As illustrated in FIG. 20, encoder 100 may encode the above flag based on a determination result. In this example, encoder 100 first obtains a parameter of the image block (S601). The parameter of the image block may be at least one of the width of the image block, the height of the image block, or a ratio of the width to the height of the image block. This parameter is also referred to as a size parameter.

Next, encoder 100 determines whether the parameter is greater than or equal to a threshold (S602). When the parameter is greater than or equal to the threshold (YES at S602), encoder 100 encodes the image block with a flag (S603). Essentially, the threshold is greater than or equal to 0.

When the parameter is not greater than or equal to the threshold (NO at S602), that is, when the parameter is less than the threshold, encoder 100 encodes the image block without a flag (S604). Alternatively, when the parameter is not greater than or equal to the threshold, encoder 100 may encode the image block with a flag indicating that the image block is not to be split into a plurality of partitions including a triangular partition.

For example, two parameters including a first parameter and a second parameter are used. The first parameter is the width of the image block, and the second parameter is the height of the image block. The threshold is a positive integer. When both the width and the height of the image block are greater than or equal to the threshold, encoder 100 encodes the image block with a flag (S603). Otherwise, encoder 100 encodes the image block without a flag (S604).

For example, two parameters including a first parameter and a second parameter are used. The first parameter is the width of the image block, and the second parameter is the height of the image block. The threshold is a positive integer. When at least one of the width or the height of the image block is greater than or equal to the threshold, encoder 100 encodes the image block with a flag (S603). Otherwise, encoder 100 encodes the image block without a flag (S604).

For example, the parameter is the width of the image block. The threshold is a positive integer. When the width of the image block is greater than or equal to the threshold, encoder 100 encodes the image block with a flag (S603). Otherwise, encoder 100 encodes the image block without a flag (S604). When encoding the image block without a flag, encoder 100 may encode the image block without splitting the image block, or may encode the image block after splitting the image block into a plurality of rectangular partitions.

In the present aspect, decoder-side motion vector refinement processing for triangular partitions is eliminated, and the inter prediction processing for triangular partitions is simplified. Accordingly, software and hardware complexity is reduced.

[Fourth Aspect of Encoding and Decoding]

Figure 23:
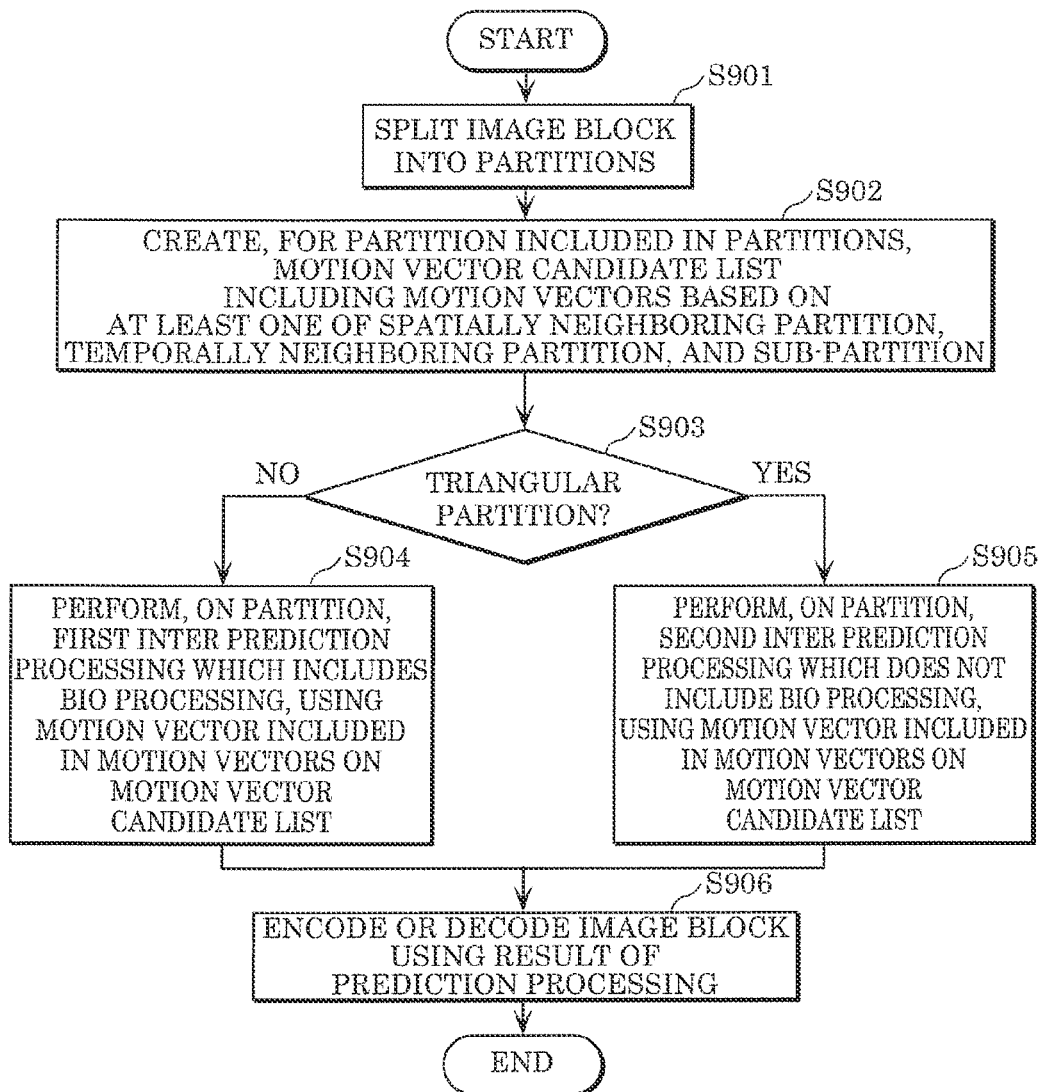
FIG. 23 is a flow chart illustrating encoding processing and decoding processing for an image block according to a fourth aspect of Embodiment 1.

FIG. 23 illustrates an encoding method and encoding processing performed by encoder 100 according to a fourth aspect. Note that a decoding method and decoding processing performed by decoder 200 are essentially the same as the encoding method and encoding processing performed by encoder 100. In the following description, "encode" or "encoding" in the encoding method and encoding processing can be replaced with "decode" or "decoding" in the decoding method and decoding processing.

First, encoder 100 splits an image block into a plurality of partitions (S901).

The image block may be split into four partitions, two partitions, or three partitions, or may be split obliquely, as illustrated in FIG. 12A, FIG. 12B, FIG. 12C, FIG. 12D, FIG. 12E, FIG. 12F, FIG. 12G, FIG. 12H, FIG. 12I, and FIG. 12J. The way in which the image block is split is not limited to those illustrated, and the illustrated ways of partitioning may be freely combined.

Moreover, the partitions may be such partitions as those illustrated in FIG. 13A, FIG. 13B, FIG. 13C, FIG. 13D, and FIG. 13E. Specifically, a partition may be a rectangular partition, a non-rectangular partition, a triangular partition, an L-shape partition, a pentagonal partition, a hexagonal partition, or a polygonal partition.

Next, encoder 100 creates a motion vector candidate list for a partition included in a plurality of partitions (S902). The motion vector candidate list may include at least one motion vector among a plurality of motion vectors for a plurality of spatially neighboring partitions, a plurality of motion vectors for a plurality of temporally neighboring partitions, and a plurality of motion vectors for a plurality of sub-partitions.

A spatially neighboring partition is a partition that spatially neighbors the partition. The spatially neighboring partition may be a partition located at the top, left, right, bottom, top-left, top-right, bottom-left, or bottom-right of the partition.

A temporally neighboring partition is a partition that temporally neighbors the partition. The temporally neighboring partition may be a co-located partition which, in a reference picture of the partition, is located in a position that corresponds to the position of the partition. The reference picture is a picture different from the current picture including the partition, and may be a picture immediately before or immediately after the current picture. For example, the spatial position of the co-located partition is the same as the position of the partition in the current picture.

The plurality of motion vectors for the plurality of sub-partitions include motion vectors predicted from motion vectors for sub-partitions which spatially or temporally neighbor the plurality of sub-partitions, and are obtained through sub-CU based motion vector prediction processing. The sub-CU based motion vector prediction processing may be ATMVP, or may be STMVP.

For example, the motion vector candidate list for the partition is the same as the motion vector candidate list created for the image block in a determined prediction mode such as a merge mode or an inter prediction mode. The determined prediction mode may be predetermined.

Encoder 100 determines whether the partition is a triangular partition (S903). When the partition is not a triangular partition (NO at S903), encoder 100 performs a first method (S904). When the partition is a triangular partition (YES at S903), encoder 100 performs a second method (S905).

In the first method, encoder 100 performs first inter prediction processing on the partition using a motion vector included in the motion vector candidate list (S904). For example, the first inter prediction processing includes motion compensation processing and BIO processing. The first inter prediction processing may include DMVR processing, but need not include DMVR processing.

For example, a prediction image obtained for the partition using the first method is the same as a portion corresponding to the partition, of a prediction image obtained for the image block without splitting the image block in a determined prediction mode such as a merge mode or an inter prediction mode. The determined prediction mode may be predetermined.

In the second method, encoder 100 performs second inter prediction processing on the partition using a motion vector included in the motion vector candidate list (S905). For example, the second inter prediction processing includes motion compensation processing, and does not include BIO processing. The second inter prediction processing may include DMVR processing, but need not include DMVR processing.

Lastly, encoder 100 encodes the image block using the result of inter prediction processing performed on the partition (S906). For example, encoder 100 performs the inter prediction processing, and obtains a prediction image as the result of the inter prediction processing. Encoder 100 then encodes the image block using the prediction image.

Encoder 100 performs the above-described processing (S902 to S905) on each of the plurality of partitions, and may encode the image block using a plurality of results of the inter prediction processing performed on the plurality of partitions.

Encoder 100 may encode a flag which indicates whether the image block is to be split into a plurality of partitions including a triangular partition. This flag is also referred to as a split parameter. For example, when the flag is 1, it indicates that the image block is to be split into a plurality of partitions including a triangular partition, whereas when the flag is 0, it indicates that the image block is not to be split into a plurality of partitions including a triangular partition.

When the flag indicates that the image block is to be split into a plurality of partitions including a triangular partition, encoder 100 encodes the image block after splitting the image block into a plurality of partitions including a triangular partition.

On the other hand, when the flag indicates that the image block is not to be split into a plurality of partitions including a triangular partition, encoder 100 encodes the image block without splitting the image block into a plurality of partitions including a triangular partition. In this case, encoder 100 may encode the image block without splitting the image block, or may encode the image block after splitting the image block into a plurality of rectangular partitions.

As illustrated in FIG. 19, encoder 100 may encode the above flag based on a determination result. In this example, encoder 100 first obtains a parameter of the image block (S501). The parameter of the image block may be at least one of the width of the image block, the height of the image block, or a ratio of the width to the height of the image block. This parameter is also referred to as a size parameter.

Next, encoder 100 determines whether the parameter is greater than or equal to a first threshold and less than or equal to a second threshold (S502). When the parameter is greater than or equal to the first threshold and less than or equal to the second threshold (YES at S502), encoder 100 encodes the image block with a flag (S503). The first threshold is less than or equal to the second threshold. Essentially, the first threshold and the second threshold are greater than or equal to 0.

When the parameter is not greater than or equal to the first threshold and less than or equal to the second threshold (NO at S502), that is, when the parameter is less than the first threshold or greater than the second threshold, encoder 100 encodes the image block without a flag (S504). Alternatively, when the parameter is not greater than or equal to the first threshold and less than or equal to the second threshold, encoder 100 may encode the image block with a flag indicating that the image block is not to be split into a plurality of partitions including a triangular partition.

The first threshold may be the reciprocal of the second threshold. The first threshold may be a positive integer or a positive fraction. The second threshold may also be a positive integer or a positive fraction.

For example, the parameter is a ratio of the width to the height of the image block. The first threshold is the reciprocal of the second threshold. When the ratio of the width to the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When both the width and the height of the image block are greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter are used. The first parameter is the width of the image block, and the second parameter is the height of the image block. The first threshold and the second threshold are both a positive integer. When at least one of the width or the height of the image block is greater than or equal to the first threshold and less than or equal to the second threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is a ratio of the width to the height of the image block. Each of the four thresholds is a positive integer. The first threshold is less than or equal to the second threshold. The third threshold is the reciprocal of the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, two parameters including a first parameter and a second parameter, and four thresholds including a first threshold, a second threshold, a third threshold, and a fourth threshold are used. The first parameter is the width of the image block, and the second parameter is the height of the image block. Each of the four thresholds is a positive integer. The first threshold is less than or equal to the second threshold. The third threshold is less than or equal to the fourth threshold.

When the first parameter is greater than or equal to the first threshold and less than or equal to the second threshold, and the second parameter is greater than or equal to the third threshold and less than or equal to the fourth threshold, encoder 100 encodes the image block with a flag (S503). Otherwise, encoder 100 encodes the image block without a flag (S504).

For example, three parameters including a first parameter, a second parameter, and a third parameter, and four thresholds including a first threshold, a second threshold, a third threshold, and a fourth threshold are used. The first parameter is the width of the image block, the second parameter is the height of the image block, and the third parameter is a ratio of the width to the height of the image block. Each of the four thresholds is a positive integer. The first threshold is less than or equal to the second threshold. The third threshold is the reciprocal of the fourth threshold.

When both the first parameter and the second parameter are greater than or equal to the first threshold and less than or equal to the second threshold, and the third parameter is greater than or equal to the third threshold and less than or equal to the fourth threshold, encoder 100 encodes the image block with a flag (S503). Otherwise, encoder 100 encodes the image block without a flag (S504).

As illustrated in FIG. 20, encoder 100 may encode the above flag based on a determination result. In this example, encoder 100 first obtains a parameter of the image block (S601). The parameter of the image block may be at least one of the width of the image block, the height of the image block, or a ratio of the width to the height of the image block. This parameter is also referred to as a size parameter.

Next, encoder 100 determines whether the parameter is greater than or equal to a threshold (S602). When the parameter is greater than or equal to the threshold (YES at S602), encoder 100 encodes the image block with a flag (S603). Essentially, the threshold is greater than or equal to 0.

When the parameter is not greater than or equal to the threshold (NO at S602), that is, when the parameter is less than the threshold, encoder 100 encodes the image block without a flag (S604). Alternatively, when the parameter is not greater than or equal to the threshold, encoder 100 may encode the image block with a flag indicating that the image block is not to be split into a plurality of partitions including a triangular partition.

For example, two parameters including a first parameter and a second parameter are used. The first parameter is the width of the image block, and the second parameter is the height of the image block. The threshold is a positive integer. When both the width and the height of the image block are greater than or equal to the threshold, encoder 100 encodes the image block with a flag (S603). Otherwise, encoder 100 encodes the image block without a flag (S604).

For example, two parameters including a first parameter and a second parameter are used. The first parameter is the width of the image block, and the second parameter is the height of the image block. The threshold is a positive integer. When at least one of the width or the height of the image block is greater than or equal to the threshold, encoder 100 encodes the image block with a flag (S603). Otherwise, encoder 100 encodes the image block without a flag (S604).

For example, the parameter is the width of the image block. The threshold is a positive integer. When the width of the image block is greater than or equal to the threshold, encoder 100 encodes the image block with a flag (S603). Otherwise, encoder 100 encodes the image block without a flag (S604).

When encoding the image block without a flag, encoder 100 may encode the image block without splitting the image block, or may encode the image block after splitting the image block into a plurality of rectangular partitions.

In the present aspect, bi-directional optical flow processing for triangular partitions is eliminated, and the inter prediction processing for triangular partitions is simplified. Accordingly, software and hardware complexity is reduced.

[Modified Aspect of Encoding and Decoding]

The triangular partition mentioned in the above description may be replaced with a non-rectangular partition. The processing may be switched depending on whether the partition is a non-rectangular partition. In doing so, the partition may be determined to be a non-rectangular partition when the partition is a triangular partition.

A non-rectangular partition may be an L-shape partition, a pentagonal partition, a hexagonal partition, or a polygonal partition as illustrated in FIG. 13A, FIG. 13B, FIG. 13C, FIG. 13D, and FIG. 13E. The image block may be split into a plurality of partitions including at least one of a non-rectangular partition or a rectangular partition.

The non-rectangular partition in the above description means a partition other than a rectangular partition. The non-rectangular partition is not limited to any of the plurality of partitions illustrated in FIG. 13A, FIG. 13B, FIG. 13C, FIG. 13D, and FIG. 13E. These partitions may be freely combined.

The partition in the above description may be replaced with a prediction unit. The partition may also be replaced with a sub-prediction unit. The image block in the above description may be replaced with a coding unit. The image block may also be replaced with a coding tree unit.

The ratio related to the size of the image block may be a ratio of the width to the height, or may be a ratio of the height to the width. One or more thresholds that are compared with a parameter related to the size of the image block may indicate a restricted range of the ratio of the width of the image block to the height of the image block. Here, the restricted range is a range for splitting the image block into a plurality of partitions including a non-rectangular partition.

When BIO processing is to be performed, encoder 100 obtains a gradient image for a prediction image, and obtains a final prediction image using the prediction image and the gradient image. Encoder 100 may obtain the gradient image by applying a filter to the prediction image to extract a difference value between pixels. When BIO processing is not to be performed, encoder 100 obtains, as a final prediction image, a prediction image obtained without using a gradient image.

The first aspect, second aspect, third aspect, and fourth aspect in the above description can be freely combined.

Implementation Example

Figure 24:
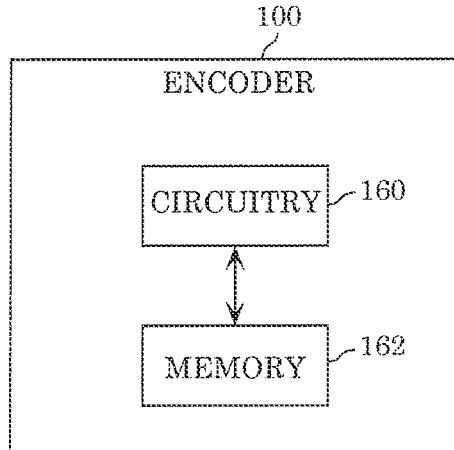
FIG. 24 is a block diagram illustrating an implementation example of the encoder according to Embodiment 1.

FIG. 24 is a block diagram illustrating an implementation example of encoder 100. Encoder 100 includes circuitry 160 and memory 162. For example, the plurality of constituent elements of encoder 100 illustrated in FIG. 1 are implemented by circuitry 160 and memory 162 illustrated in FIG. 24.

Circuitry 160 is electronic circuitry accessible to memory 162, and performs information processing. For example, circuitry 160 is exclusive or general electronic circuitry which encodes a video using memory 162. Circuitry 160 may be a processor such as a CPU. Circuitry 160 may be an aggregate of a plurality of electronic circuits.

Moreover, for example, circuitry 160 may perform the functions of two or more constituent elements among the plurality of constituent elements of encoder 100 illustrated in FIG. 1, except the constituent elements that store information. In other words, circuitry 160 may perform the above-described operations as the operations of the two or more constituent elements.

Memory 162 is an exclusive or general memory for storing information used by circuitry 160 to encode a video. Memory 162 may be an electronic circuit, may be connected to circuitry 160, or may be included in circuitry 160.

Memory 162 may be an aggregate of a plurality of electronic circuits, or may be configured in the form of a plurality of sub-memories. Memory 162 may be a magnetic disc, an optical disc, or the like, or may be expressed as storage, a recording medium, or the like. Memory 162 may be a non-volatile memory or a volatile memory.

For example, memory 162 may perform the functions of, among the plurality of constituent elements of encoder 100 illustrated in FIG. 1, the constituent elements that store information. Specifically, memory 162 may perform the functions of block memory 118 and frame memory 122 illustrated in FIG. 1.

Moreover, memory 162 may store a video to be encoded, or may store a bitstream corresponding to an encoded video. Memory 162 may store a program for causing circuitry 160 to encode a video.

Note that not all of the plurality of constituent elements illustrated in FIG. 1 need to be implemented by encoder 100, and not all of the processes described above need to be performed by encoder 100. Some of the constituent elements illustrated in FIG. 1 may be included in another device, and some of the processes described above may be performed by another device. An image block can be efficiently processed by encoder 100 implementing some of the constituent elements illustrated in FIG. 1 and performing some of the processes described above.

Figure 25:
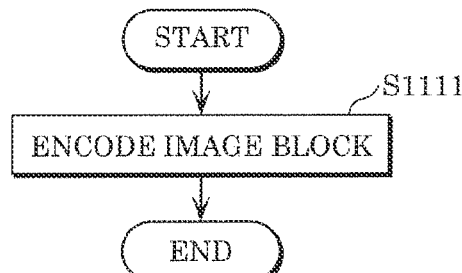
FIG. 25 is a flow chart illustrating a first operation example of the encoder according to Embodiment 1.

FIG. 25 is a flow chart illustrating a first operation example of encoder 100 illustrated in FIG. 24. For example, circuitry 160 included in encoder 100 performs the operation illustrated in FIG. 25, using memory 162. Specifically, circuitry 160 encodes an image block (S1111).

For example, when encoding the image block, circuitry 160 obtains one or more size parameters related to the size of the image block. Circuitry 160 then determines whether the one or more size parameters and one or more thresholds satisfy a determined relationship. The determined relationship may be predetermined.

Circuitry 160 then encodes a split parameter when the one or more size parameters and the one or more thresholds are determined to satisfy the determined relationship. Here, the split parameter indicates whether the image block is to be split into a plurality of partitions including a non-rectangular partition. Circuitry 160 then encodes the image block after splitting the image block into the plurality of partitions when the split parameter indicates that the image block is to be split into the plurality of partitions.

With this, encoder 100 can switch whether or not to split the image block into a plurality of partitions including a non-rectangular partition, when the one or more size parameters related to the size of the image block and the one or more thresholds satisfy the determined relationship. Accordingly, encoder 100 can efficiently process the image block.

For example, circuitry 160 encodes the image block without encoding the split parameter when the one or more size parameters and the one or more thresholds are determined not to satisfy the determined relationship. With this, the encoding amount can be reduced. Moreover, encoder 100 can reduce the amount of processing for encoding the split parameter.

For example, circuitry 160 encodes the image block without splitting the image block or encodes the image block after splitting the image block into a plurality of rectangular partitions, when the one or more size parameters and the one or more thresholds are determined not to satisfy the determined relationship. With this, encoder 100 can reduce splitting of the image block into a plurality of partitions including a non-rectangular partition.

For example, circuitry 160 encodes the image block without splitting the image block or encodes the image block after splitting the image block into a plurality of rectangular partitions, when the split parameter indicates that the image block is not to be split into the plurality of partitions. With this, encoder 100 can reduce splitting of the image block into a plurality of partitions including a non-rectangular partition.

For example, the one or more thresholds comprise one threshold. The determined relationship is that each of the one or more size parameters is greater than or equal to the one threshold, or that at least one of the one or more size parameters is greater than or equal to the one threshold. With this, the encoder can switch whether or not to split the image block into a plurality of partitions including a non-rectangular partition, when the one or more size parameters are greater than or equal to the one threshold.

For example, the one or more thresholds comprise a first threshold and a second threshold, and the first threshold is less than or equal to the second threshold. The determined relationship is that each of the one or more size parameters is greater than or equal to the first threshold and less than or equal to the second threshold, or that at least one of the one or more size parameters is greater than or equal to the first threshold and less than or equal to the second threshold. With this, encoder 100 can switch whether or not to split the image block into a plurality of partitions including a non-rectangular partition, when the one or more size parameters are greater than or equal to the first threshold and less than or equal to the second threshold.

For example, the non-rectangular partition is a triangular partition. With this, encoder 100 can switch whether or not to split the image block into a plurality of partitions including a triangular partition, when the one or more size parameters related to the size of the image block and the one or more thresholds satisfy the determined relationship.

For example, the one or more size parameters include at least one of a ratio of the width of the image block to the height of the image block, a ratio of the height of the image block to the width of the image block, the width of the image block, or the height of the image block. With this, encoder 100 can use, as a size parameter, at least one of the ratio of the width to the height of the image block, the ratio of the height to the width of the image block, the width of the image block, or the height of the image block.

For example, each of the one or more thresholds is greater than or equal to zero. With this, encoder 100 can switch whether or not to split the image block into a plurality of partitions including a non-rectangular partition, when the one or more size parameters and the one or more thresholds, each of which is greater than or equal to zero, satisfy the determined relationship.

For example, the one or more thresholds indicate a restricted range of a ratio of the width of the image block to the height of the image block. Here, the restricted range is a range for splitting the image block into the plurality of partitions. With this, encoder 100 can switch whether or not to split the image block into a plurality of partitions including a non-rectangular partition, when the one or more size parameters and the one or more thresholds, which indicate a restricted range of the ratio of the width to the height, satisfy the determined relationship.

Figure 26:
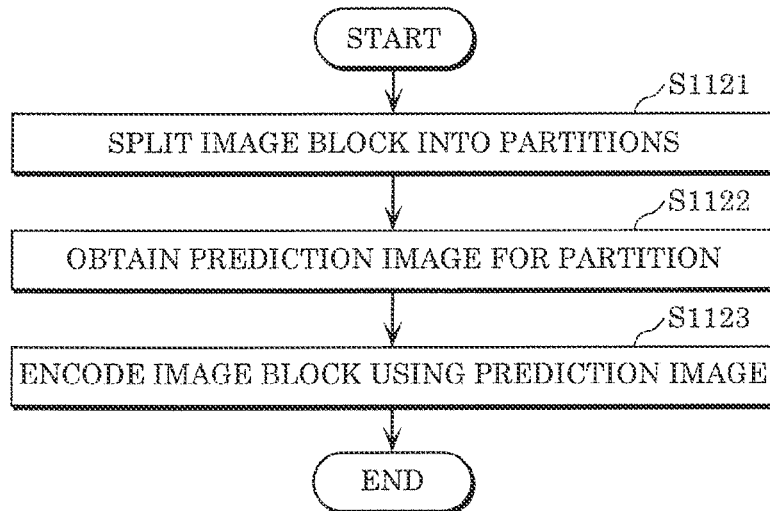
FIG. 26 is a flow chart illustrating a second operation example of the encoder according to Embodiment 1.

FIG. 26 is a flow chart illustrating a second operation example of encoder 100 illustrated in FIG. 24. For example, circuitry 160 included in encoder 100 performs the operations illustrated in FIG. 26, using memory 162.

Specifically, circuitry 160 splits an image block into a plurality of partitions (S1121). Circuitry 160 then obtains a prediction image for a partition included in the plurality of partitions (S1122). Circuitry 160 then encodes the image block using the prediction image (S1123).

For example, when obtaining the prediction image, circuitry 160 determines whether the partition is a non-rectangular partition.

Here, when the partition is determined not to be a non-rectangular partition, circuitry 160 obtains a first prediction image for the partition using a first motion vector for the partition. Then, circuitry 160 obtains a second motion vector for the partition using the first prediction image, and obtains a second prediction image for the partition as the prediction image using the second motion vector.

On the other hand, when the partition is determined to be a non-rectangular partition, circuitry 160 obtains the first prediction image as the prediction image using the first motion vector, without using the second motion vector.

With this, encoder 100 can reduce the two-step operation for non-rectangular partitions, and suppress an increase in the processing amount. Accordingly, encoder 100 can efficiently process the image block.

For example, circuitry 160 determines that the partition is a non-rectangular partition when the partition is a triangular partition. With this, encoder 100 can suppress an increase in the processing amount for triangular partitions.

For example, the prediction image obtained when the partition is determined not to be a non-rectangular partition is the same as a portion corresponding to the partition, of a prediction image obtained for the image block in a determined prediction mode. Here, the prediction image obtained for the image block in the determined prediction mode is a prediction image obtained for the image block without splitting the image block into the plurality of partitions. The determined prediction mode may be predetermined.

With this, encoder 100 can obtain a prediction image for a rectangular partition in the same manner as in the case of obtaining a prediction image for the image block without splitting the image block into a plurality of partitions. Accordingly, encoder 100 can simplify the processing.

For example, circuitry 160 obtains the second motion vector by performing motion estimation using the first prediction image. With this, encoder 100 can obtain an appropriate second motion vector using the first prediction image, and obtain an appropriate second prediction image using the appropriate second motion vector.

For example, when obtaining the prediction image, circuitry 160 determines whether the partition is a non-rectangular partition.

Here, when the partition is determined not to be a non-rectangular partition, circuitry 160 obtains (i) a first prediction image for the partition, (ii) a gradient image for the first prediction image, and (iii) a second prediction image as the prediction image using the first prediction image and the gradient image. On the other hand, when the partition is determined to be a non-rectangular partition, circuitry 160 obtains the first prediction image as the prediction image without using the gradient image.

With this, encoder 100 can reduce use of a gradient image for non-rectangular partitions, and suppress an increase in the processing amount. Accordingly, encoder 100 can efficiently process the image block.

For example, circuitry 160 determines that the partition is a non-rectangular partition when the partition is a triangular partition. With this, encoder 100 can suppress an increase in the processing amount for triangular partitions.

For example, the prediction image obtained when the partition is determined not to be a non-rectangular partition is the same as a portion corresponding to the partition, of a prediction image obtained for the image block in a determined prediction mode. The prediction image obtained for the image block in the determined prediction mode is a prediction image obtained for the image block without splitting the image block into the plurality of partitions. The determined prediction mode may be predetermined.

With this, encoder 100 can obtain a prediction image for a rectangular partition in the same manner as in the case of obtaining a prediction image for the image block without splitting the image block into a plurality of partitions. Accordingly, encoder 100 can simplify the processing.

For example, circuitry 160 obtains the gradient image by applying a filter to the first prediction image to extract a difference value between pixels. With this, encoder 100 can obtain an appropriate gradient image for the first prediction image, and obtain an appropriate second prediction image using the appropriate gradient image.

Figure 27:
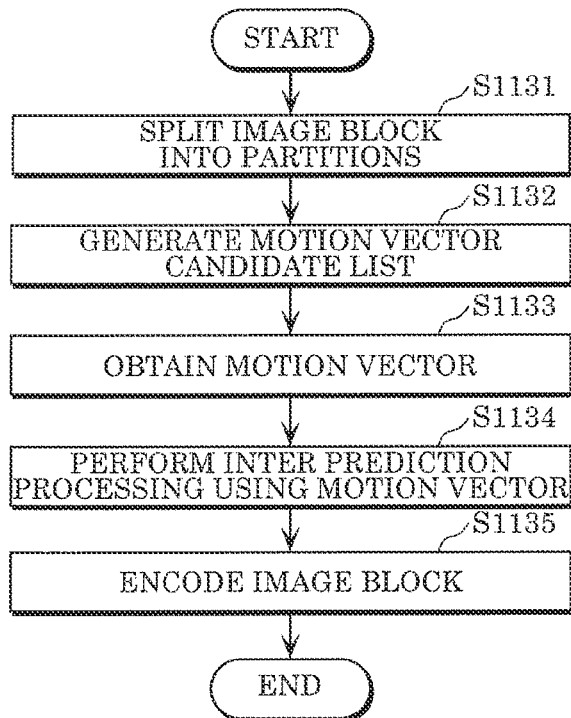
FIG. 27 is a flow chart illustrating a third operation example of the encoder according to Embodiment 1.

FIG. 27 is a flow chart illustrating a third operation example of encoder 100 illustrated in FIG. 24. For example, circuitry 160 included in encoder 100 performs the operations illustrated in FIG. 27, using memory 162.

Specifically, circuitry 160 splits an image block into a plurality of partitions (S1131). Circuitry 160 then generates a motion vector candidate list for a partition included in the plurality of partitions (S1132).

Circuitry 160 then obtains a motion vector for the partition from the motion vector candidate list (S1133). Circuitry 160 then performs inter prediction processing for the partition using the motion vector for the partition (S1134). Circuitry 160 then encodes the image block using the result of the inter prediction processing (S1135).

For example, when generating the motion vector candidate list, circuitry 160 determines whether the partition is a non-rectangular partition.

When the partition is determined not to be a non-rectangular partition, circuitry 160 generates the motion vector candidate list. When doing so, circuitry 160 uses at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition.

Even when the partition is determined to be a non-rectangular partition, circuitry 160 generates the motion vector candidate list. However, when doing so, circuitry 160 does not use the plurality of motion vectors for the plurality of sub-partitions, but uses at least one motion vector among the plurality of motion vectors for the plurality of spatially neighboring partitions and the plurality of motion vectors for the plurality of temporally neighboring partitions.

Here, the plurality of spatially neighboring partitions are partitions that spatially neighbor the partition. The plurality of temporally neighboring partitions are partitions that temporally neighbor the partition. The plurality of sub-partitions are included in the partition.

With this, encoder 100 can reduce use, for non-rectangular partitions, of a plurality of motion vectors for a plurality of sub-partitions, and suppress an increase in the processing amount. Accordingly, encoder 100 can efficiently process the image block.

For example, circuitry 160 determines that the partition is a non-rectangular partition when the partition is a triangular partition. With this, encoder 100 can suppress an increase in the processing amount for triangular partitions.

For example, the plurality of motion vectors for the plurality of sub-partitions include motion vectors predicted from motion vectors for regions which spatially or temporally neighbor the plurality of sub-partitions. With this, encoder 100 can use a motion vector which is predicted, as a motion vector for a sub-partition, from a motion vector for a region neighboring the sub-partition.

For example, the motion vector candidate list generated when the partition is determined not to be a non-rectangular partition is the same as a motion vector candidate list generated for the image block in a determined prediction mode. With this, encoder 100 can generate the motion vector candidate list for a rectangular partition in the same manner as in the case of generating a motion vector candidate list for the image block. Accordingly, encoder 100 can simplify the processing. The determined prediction mode may be predetermined.

For example, each of the plurality of temporally neighboring partitions is a co-located partition which, in a picture different from a picture that includes the partition, is located in a position that corresponds to a position of the partition. With this, encoder 100 can use the motion vector for the co-located partition as a motion vector for the temporally neighboring partition.

Figure 28:
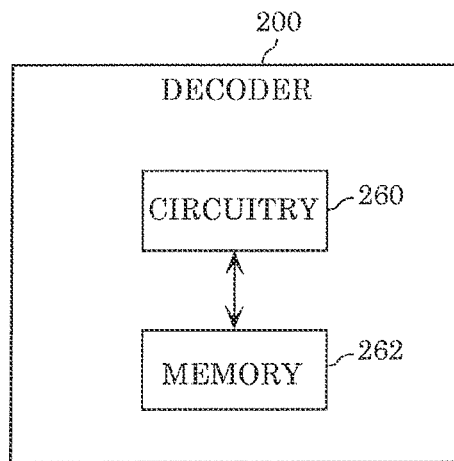
FIG. 28 is a block diagram illustrating an implementation example of the decoder according to Embodiment 1.

FIG. 28 is a block diagram illustrating an implementation example of decoder 200. Decoder 200 includes circuitry 260 and memory 262. For example, the plurality of constituent elements of decoder 200 illustrated in FIG. 10 are implemented by circuitry 260 and memory 262 illustrated in FIG. 28.

Circuitry 260 is electronic circuitry accessible to memory 262, and performs information processing. For example, circuitry 260 is exclusive or general electronic circuitry which decodes a video using memory 262. Circuitry 260 may be a processor such as a CPU. Circuitry 260 may be an aggregate of a plurality of electronic circuits.

Moreover, for example, circuitry 260 may perform the functions of two or more constituent elements among the plurality of constituent elements of decoder 200 illustrated in FIG. 10, except the constituent elements that store information. In other words, circuitry 260 may perform the above-described operations as the operations of the two or more constituent elements.

Memory 262 is an exclusive or general memory for storing information used by circuitry 260 to decode a video. Memory 262 may be an electronic circuit, may be connected to circuitry 260, or may be included in circuitry 260.

Memory 262 may be an aggregate of a plurality of electronic circuits, or may be configured in the form of a plurality of sub-memories. Memory 262 may be a magnetic disc, an optical disc, or the like, or may be expressed as storage, a recording medium, or the like. Memory 262 may be a non-volatile memory or a volatile memory.

For example, memory 262 may perform the functions of, among the plurality of constituent elements of decoder 200 illustrated in FIG. 10, the constituent elements that store information. Specifically, memory 262 may perform the functions of block memory 210 and frame memory 214 illustrated in FIG. 10.

Moreover, memory 262 may store a bitstream corresponding to an encoded video, or may store a decoded video. Memory 262 may store a program for causing circuitry 260 to decode a video.

Note that not all of the plurality of constituent elements illustrated in FIG. 10 need to be implemented by decoder 200, and not all of the processes described above need to be performed by decoder 200. Some of the constituent elements illustrated in FIG. 10 may be included in another device, and some of the processes described above may be performed by another device. An image block can be efficiently processed by decoder 200 implementing some of the constituent elements illustrated in FIG. 10 and performing some of the processes described above.

Figure 29:
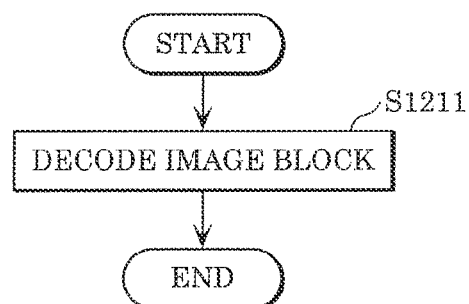
FIG. 29 is a flow chart illustrating a first operation example of the decoder according to Embodiment 1.

FIG. 29 is a flow chart illustrating a first operation example of decoder 200 illustrated in FIG. 28. For example, circuitry 260 included in decoder 200 performs the operation illustrated in FIG. 29, using memory 262. Specifically, circuitry 260 decodes an image block (S1211).

For example, when decoding the image block, circuitry 260 obtains one or more size parameters related to the size of the image block. Circuitry 260 then determines whether the one or more size parameters and one or more thresholds satisfy a determined relationship. The determined relationship may be predetermined.

Circuitry 260 then decodes a split parameter when the one or more size parameters and the one or more thresholds are determined to satisfy the determined relationship. Here, the split parameter indicates whether the image block is to be split into a plurality of partitions including a non-rectangular partition. Circuitry 260 then decodes the image block after splitting the image block into the plurality of partitions when the split parameter indicates that the image block is to be split into the plurality of partitions.

With this, decoder 200 can switch whether or not to split the image block into a plurality of partitions including a non-rectangular partition, when the one or more size parameters related to the size of the image block and the one or more thresholds satisfy the determined relationship. Accordingly, decoder 200 can efficiently process the image block.

For example, circuitry 260 decodes the image block without decoding the split parameter when the one or more size parameters and the one or more thresholds are determined not to satisfy the determined relationship. With this, the coding amount can be reduced. Moreover, decoder 200 can reduce the amount of processing for decoding the split parameter.

For example, circuitry 260 decodes the image block without splitting the image block or decodes the image block after splitting the image block into a plurality of rectangular partitions, when the one or more size parameters and the one or more thresholds are determined not to satisfy the determined relationship. With this, decoder 200 can reduce splitting of the image block into a plurality of partitions including a non-rectangular partition.

For example, circuitry 260 decodes the image block without splitting the image block or decodes the image block after splitting the image block into a plurality of rectangular partitions, when the split parameter indicates that the image block is not to be split into the plurality of partitions. With this, decoder 200 can reduce splitting of the image block into a plurality of partitions including a non-rectangular partition.

For example, the one or more thresholds comprise one threshold. The determined relationship is that each of the one or more size parameters is greater than or equal to the one threshold, or that at least one of the one or more size parameters is greater than or equal to the one threshold. With this, decoder 200 can switch whether or not to split the image block into a plurality of partitions including a non-rectangular partition, when the one or more size parameters are greater than or equal to the one threshold.

For example, the one or more thresholds comprise a first threshold and a second threshold, and the first threshold is less than or equal to the second threshold. The determined relationship is that each of the one or more size parameters is greater than or equal to the first threshold and less than or equal to the second threshold, or that at least one of the one or more size parameters is greater than or equal to the first threshold and less than or equal to the second threshold. With this, decoder 200 can switch whether or not to split the image block into a plurality of partitions including a non-rectangular partition, when the one or more size parameters are greater than or equal to the first threshold and less than or equal to the second threshold.

For example, the non-rectangular partition is a triangular partition. With this, decoder 200 can switch whether or not to split the image block into a plurality of partitions including a triangular partition, when the one or more size parameters related to the size of the image block and the one or more thresholds satisfy the determined relationship.

For example, the one or more size parameters include at least one of a ratio of the width of the image block to the height of the image block, a ratio of the height of the image block to the width of the image block, the width of the image block, or the height of the image block. With this, decoder 200 can use, as a size parameter, at least one of the ratio of the width to the height of the image block, the ratio of the height to the width of the image block, the width of the image block, or the height of the image block.

For example, each of the one or more thresholds is greater than or equal to zero. With this, decoder 200 can switch whether or not to split the image block into a plurality of partitions including a non-rectangular partition, when the one or more size parameters and the one or more thresholds, each of which is greater than or equal to zero, satisfy the determined relationship.

For example, the one or more thresholds indicate a restricted range of a ratio of the width of the image block to the height of the image block. Here, the restricted range is a range for splitting the image block into the plurality of partitions. With this, decoder 200 can switch whether or not to split the image block into a plurality of partitions including a non-rectangular partition, when the one or more size parameters and the one or more thresholds, which indicate a restricted range of the ratio of the width to the height, satisfy the determined relationship.

Figure 30:
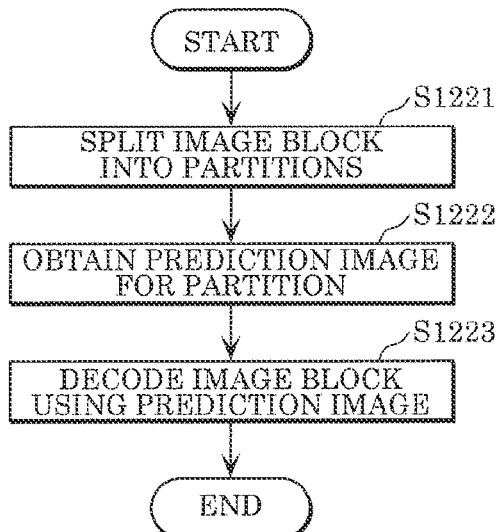
FIG. 30 is a flow chart illustrating a second operation example of the decoder according to Embodiment 1.

FIG. 30 is a flow chart illustrating a second operation example of decoder 200 illustrated in FIG. 28. For example, circuitry 260 included in decoder 200 performs the operations illustrated in FIG. 30, using memory 262. For example, circuitry 260 splits an image block into a plurality of partitions (S1221). Circuitry 260 then obtains a prediction image for a partition included in the plurality of partitions (S1222). Circuitry 260 then decodes the image block using the prediction image (S1223).

For example, when obtaining the prediction image, circuitry 260 determines whether the partition is a non-rectangular partition.

Here, when the partition is determined not to be a non-rectangular partition, circuitry 260 obtains a first prediction image for the partition using a first motion vector for the partition. Then, circuitry 260 obtains a second motion vector for the partition using the first prediction image, and obtains a second prediction image for the partition as the prediction image using the second motion vector.

On the other hand, when the partition is determined to be a non-rectangular partition, circuitry 260 obtains the first prediction image as the prediction image using the first motion vector, without using the second motion vector.

With this, decoder 200 can reduce the two-step operation for non-rectangular partitions, and suppress an increase in the processing amount. Accordingly, decoder 200 can efficiently process the image block.

For example, circuitry 260 determines that the partition is a non-rectangular partition when the partition is a triangular partition. With this, decoder 200 can suppress an increase in the processing amount for triangular partitions.

For example, the prediction image obtained when the partition is determined not to be a non-rectangular partition is the same as a portion corresponding to the partition, of a prediction image obtained for the image block in a determined prediction mode. The prediction image obtained for the image block in the determined prediction mode is a prediction image obtained for the image block without splitting the image block into the plurality of partitions. The determined prediction mode may be predetermined.

With this, decoder 200 can obtain a prediction image for a rectangular partition in the same manner as in the case of obtaining a prediction image for the image block without splitting the image block into a plurality of partitions. Accordingly, decoder 200 can simplify the processing.

For example, circuitry 260 obtains the second motion vector by performing motion estimation using the first prediction image. With this, decoder 200 can obtain an appropriate second motion vector using the first prediction image, and obtain an appropriate second prediction image using the appropriate second motion vector.

For example, when obtaining the prediction image, circuitry 260 determines whether the partition is a non-rectangular partition.

Here, when the partition is determined not to be a non-rectangular partition, circuitry 260 obtains (i) a first prediction image for the partition, (ii) a gradient image for the first prediction image, and (iii) a second prediction image as the prediction image using the first prediction image and the gradient image. On the other hand, when the partition is determined to be a non-rectangular partition, circuitry 260 obtains the first prediction image as the prediction image without using the gradient image.

With this, decoder 200 can reduce use of a gradient image for non-rectangular partitions, and suppress an increase in the processing amount. Accordingly, decoder 200 can efficiently process the image block.

For example, circuitry 260 determines that the partition is a non-rectangular partition when the partition is a triangular partition. With this, decoder 200 can suppress an increase in the processing amount for triangular partitions.

For example, the prediction image obtained when the partition is determined not to be a non-rectangular partition is the same as a portion corresponding to the partition, of a prediction image obtained for the image block in a determined prediction mode. Here, the prediction image obtained for the image block in the determined prediction mode is a prediction image obtained for the image block without splitting the image block into the plurality of partitions. The determined prediction mode may be predetermined.

With this, decoder 200 can obtain a prediction image for a rectangular partition in the same manner as in the case of obtaining a prediction image for the image block without splitting the image block into a plurality of partitions. Accordingly, decoder 200 can simplify the processing.

For example, circuitry 260 obtains the gradient image by applying a filter to the first prediction image to extract a difference value between pixels. With this, decoder 200 can obtain an appropriate gradient image for the first prediction image, and obtain an appropriate second prediction image using the appropriate gradient image.

Figure 31:
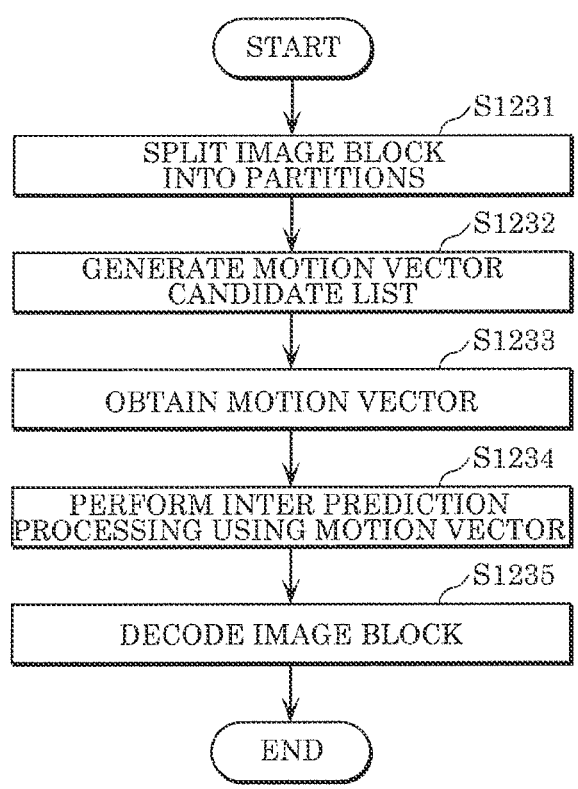
FIG. 31 is a flow chart illustrating a third operation example of the decoder according to Embodiment 1.

FIG. 31 is a flow chart illustrating a third operation example of decoder 200 illustrated in FIG. 28. For example, circuitry 260 included in decoder 200 performs the operations illustrated in FIG. 31, using memory 262.

For example, circuitry 260 splits an image block into a plurality of partitions (S1231). Circuitry 260 then generates a motion vector candidate list for a partition included in the plurality of partitions (S1232).

Circuitry 260 then obtains a motion vector for the partition from the motion vector candidate list (S1233). Circuitry 260 then performs inter prediction processing for the partition using the motion vector for the partition (S1234). Circuitry 260 then decodes the image block using the result of the inter prediction processing (S1235).

For example, when generating the motion vector candidate list, circuitry 260 determines whether the partition is a non-rectangular partition.

When the partition is determined not to be a non-rectangular partition, circuitry 260 generates the motion vector candidate list. When doing so, circuitry 260 uses at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition.

Even when the partition is determined to be a non-rectangular partition, circuitry 260 generates the motion vector candidate list. However, when doing so, circuitry 260 does not use the plurality of motion vectors for the plurality of sub-partitions, but uses at least one motion vector among the plurality of motion vectors for the plurality of spatially neighboring partitions and the plurality of motion vectors for the plurality of temporally neighboring partitions.

Here, the plurality of spatially neighboring partitions are partitions that spatially neighbor the partition. The plurality of temporally neighboring partitions are partitions that temporally neighbor the partition. The plurality of sub-partitions are included in the partition.

With this, decoder 200 can reduce use, for non-rectangular partitions, of a plurality of motion vectors for a plurality of sub-partitions, and suppress an increase in the processing amount. Accordingly, decoder 200 can efficiently process the image block.

For example, circuitry 260 determines that the partition is a non-rectangular partition when the partition is a triangular partition. With this, decoder 200 can suppress an increase in the processing amount for triangular partitions.

For example, the plurality of motion vectors for the plurality of sub-partitions include motion vectors predicted from motion vectors for regions which spatially or temporally neighbor the plurality of sub-partitions. With this, decoder 200 can use a motion vector which is predicted, as a motion vector for a sub-partition, from a motion vector for a region neighboring the sub-partition.

For example, the motion vector candidate list generated when the partition is determined not to be a non-rectangular partition is the same as a motion vector candidate list generated for the image block in a determined prediction mode. With this, decoder 200 can generate the motion vector candidate list for a rectangular partition in the same manner as in the case of generating a motion vector candidate list for the image block. Accordingly, decoder 200 can simplify the processing. The determined prediction mode may be predetermined.

For example, each of the plurality of temporally neighboring partitions is a co-located partition which, in a picture different from a picture that includes the partition, is located in a position that corresponds to a position of the partition. With this, decoder 200 can use the motion vector for the co-located partition as a motion vector for the temporally neighboring partition.

[Supplemental Information]

Encoder 100 and decoder 200 according to the present embodiment may be used as an image encoder and an image decoder, respectively, or may be used as a video encoder and a video decoder, respectively.

Alternatively, each of encoder 100 and decoder 200 can be used as a prediction device or an inter prediction device. That is to say, each of encoder 100 and decoder 200 may correspond only to inter predictor 126 and inter predictor 218. The other constituent elements such as entropy encoder 110 and entropy decoder 202 may be included in another device.

At least part of the present embodiment may be used as an encoding method, a decoding method, a prediction method, or another method.

In the present embodiment, each of the constituent elements may be configured in the form of an exclusive hardware product, or may be implemented by executing a software program suitable for the constituent element. Each of the constituent elements may be implemented by means of a program execution unit, such as a CPU or a processor, reading and executing a software program recorded on a recording medium such as a hard disk or a semiconductor memory.

Specifically, encoder 100 and decoder 200 may each include processing circuitry and storage electrically connected to the processing circuitry and accessible from the processing circuitry. For example, the processing circuitry corresponds to circuitry 160 or 260, and the storage corresponds to memory 162 or 262.

The processing circuitry includes at least one of an exclusive hardware product or a program execution unit, and performs processing using the storage. When the processing circuitry includes a program execution unit, the storage stores a software program executed by the program execution unit.

Here, the software for implementing, for example, encoder 100 or decoder 200 according to the present embodiment is a program as follows:

The program causes a computer to perform an encoding method which includes encoding an image block. The encoding of the image block includes: obtaining one or more size parameters related to a size of the image block; determining whether the one or more size parameters and one or more thresholds satisfy a determined relationship; encoding a split parameter when the one or more size parameters and the one or more thresholds are determined to satisfy the determined relationship, the split parameter indicating whether the image block is to be split into a plurality of partitions including a non-rectangular partition; and encoding the image block after splitting the image block into the plurality of partitions when the split parameter indicates that the image block is to be split into the plurality of partitions. The determined relationship may be predetermined.

Alternatively, the program causes a computer to perform a decoding method which includes decoding an image block. The decoding of the image block includes: obtaining one or more size parameters related to a size of the image block; determining whether the one or more size parameters and one or more thresholds satisfy a determined relationship; decoding a split parameter when the one or more size parameters and the one or more thresholds are determined to satisfy the determined relationship, the split parameter indicating whether the image block is to be split into a plurality of partitions including a non-rectangular partition; and decoding the image block after splitting the image block into the plurality of partitions when the split parameter indicates that the image block is to be split into the plurality of partitions. The determined relationship may be predetermined.

Alternatively, the program causes a computer to perform an encoding method which includes: splitting an image block into a plurality of partitions; obtaining a prediction image for a partition included in the plurality of partitions; and encoding the image block using the prediction image. The obtaining of the prediction image includes: determining whether the partition is a non-rectangular partition; when the partition is determined not to be a non-rectangular partition, obtaining (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtaining the first prediction image as the prediction image using the first motion vector, without using the second motion vector.

Alternatively, the program causes a computer to perform a decoding method which includes: splitting an image block into a plurality of partitions; obtaining a prediction image for a partition included in the plurality of partitions; and decoding the image block using the prediction image. The obtaining of the prediction image includes: determining whether the partition is a non-rectangular partition; when the partition is determined not to be a non-rectangular partition, obtaining (i) a first prediction image for the partition using a first motion vector for the partition, (ii) a second motion vector for the partition using the first prediction image, and (iii) a second prediction image for the partition as the prediction image using the second motion vector; and when the partition is determined to be a non-rectangular partition, obtaining the first prediction image as the prediction image using the first motion vector, without using the second motion vector.

Alternatively, the program causes a computer to perform an encoding method which includes: splitting an image block into a plurality of partitions; obtaining a prediction image for a partition included in the plurality of partitions; and encoding the image block using the prediction image. The obtaining of the prediction image includes: determining whether the partition is a non-rectangular partition; when the partition is determined not to be a non-rectangular partition, obtaining (i) a first prediction image for the partition, (ii) a gradient image for the first prediction image, and (iii) a second prediction image as the prediction image using the first prediction image and the gradient image; and when the partition is determined to be a non-rectangular partition, obtaining the first prediction image as the prediction image without using the gradient image.

Alternatively, the program causes a computer to perform a decoding method which includes: splitting an image block into a plurality of partitions; obtaining a prediction image for a partition included in the plurality of partitions; and decoding the image block using the prediction image. The obtaining of the prediction image includes: determining whether the partition is a non-rectangular partition; when the partition is determined not to be a non-rectangular partition, obtaining (i) a first prediction image for the partition, (ii) a gradient image for the first prediction image, and (iii) a second prediction image as the prediction image using the first prediction image and the gradient image; and when the partition is determined to be a non-rectangular partition, obtaining the first prediction image as the prediction image without using the gradient image.

Alternatively, the program causes a computer to perform an encoding method which includes: splitting an image block into a plurality of partitions; generating a motion vector candidate list for a partition included in the plurality of partitions; obtaining a motion vector for the partition from the motion vector candidate list; performing inter prediction processing for the partition using the motion vector for the partition; and encoding the image block using a result of the inter prediction processing. The generating of the motion vector candidate list includes: determining whether the partition is a non-rectangular partition; when the partition is determined not to be a non-rectangular partition, generating the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generating the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

Alternatively, the program causes a computer to perform a decoding method which includes: splitting an image block into a plurality of partitions; generating a motion vector candidate list for a partition included in the plurality of partitions; obtaining a motion vector for the partition from the motion vector candidate list; performing inter prediction processing for the partition using the motion vector for the partition; and decoding the image block using a result of the inter prediction processing. The generating of the motion vector candidate list includes: determining whether the partition is a non-rectangular partition; when the partition is determined not to be a non-rectangular partition, generating the motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition; and when the partition is determined to be a non-rectangular partition, generating the motion vector candidate list using at least one motion vector among the plurality of motion vectors for the plurality of spatially neighboring partitions and the plurality of motion vectors for the plurality of temporally neighboring partitions, without using the plurality of motion vectors for the plurality of sub-partitions.

It is noted that "at least one of A, B, and C" as used herein denotes the conjunctive and the disjunctive, unless the context indicates otherwise. For example, as disclosed herein, generating a motion vector candidate list using at least one motion vector among a plurality of motion vectors for a plurality of spatially neighboring partitions that spatially neighbor the partition, a plurality of motion vectors for a plurality of temporally neighboring partitions that temporally neighbor the partition, and a plurality of motion vectors for a plurality of sub-partitions included in the partition, includes generating a motion vector candidate list including a motion vector of a spatially neighboring partition, without including a motion vector of a temporally neighboring partition.

The constituent elements may be circuits as described above. The circuits may constitute circuitry as a whole, or may be individual circuits. Each constituent element may be implemented by a general processor, or may be implemented by an exclusive processor.

Moreover, processing executed by a particular constituent element may be executed by another constituent element. The processing execution order may be modified, or a plurality of processes may be executed in parallel. Furthermore, an encoding and decoding device may include encoder 100 and decoder 200.

The ordinal numbers such as "first" and "second" used in the description may be changed as appropriate. New ordinal numbers may be given to the constituent elements, or the ordinal numbers of the constituent elements may be removed.

Although some aspects of encoder 100 and decoder 200 have been described above based on an embodiment, the aspects of encoder 100 and decoder 200 are not limited to this embodiment. Various modifications to this embodiment that are conceivable to those skilled in the art, as well as embodiments resulting from combinations of constituent elements in different embodiments, may be included within the scope of the aspects of encoder 100 and decoder 200, so long as they do not depart from the essence of the present disclosure.

This aspect may be implemented in combination with one or more of the other aspects according to the present disclosure. In addition, part of the processes in the flowcharts, part of the constituent elements of the apparatuses, and part of the syntax described in this aspect may be implemented in combination with other aspects.

Embodiment 2

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments and aspects of the present disclosure are not limited to the above exemplary embodiments and aspects; various modifications may be made to the exemplary embodiments and aspects, the results of which are also included within the scope of the embodiments and aspects of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

Usage Examples

Figure 32:
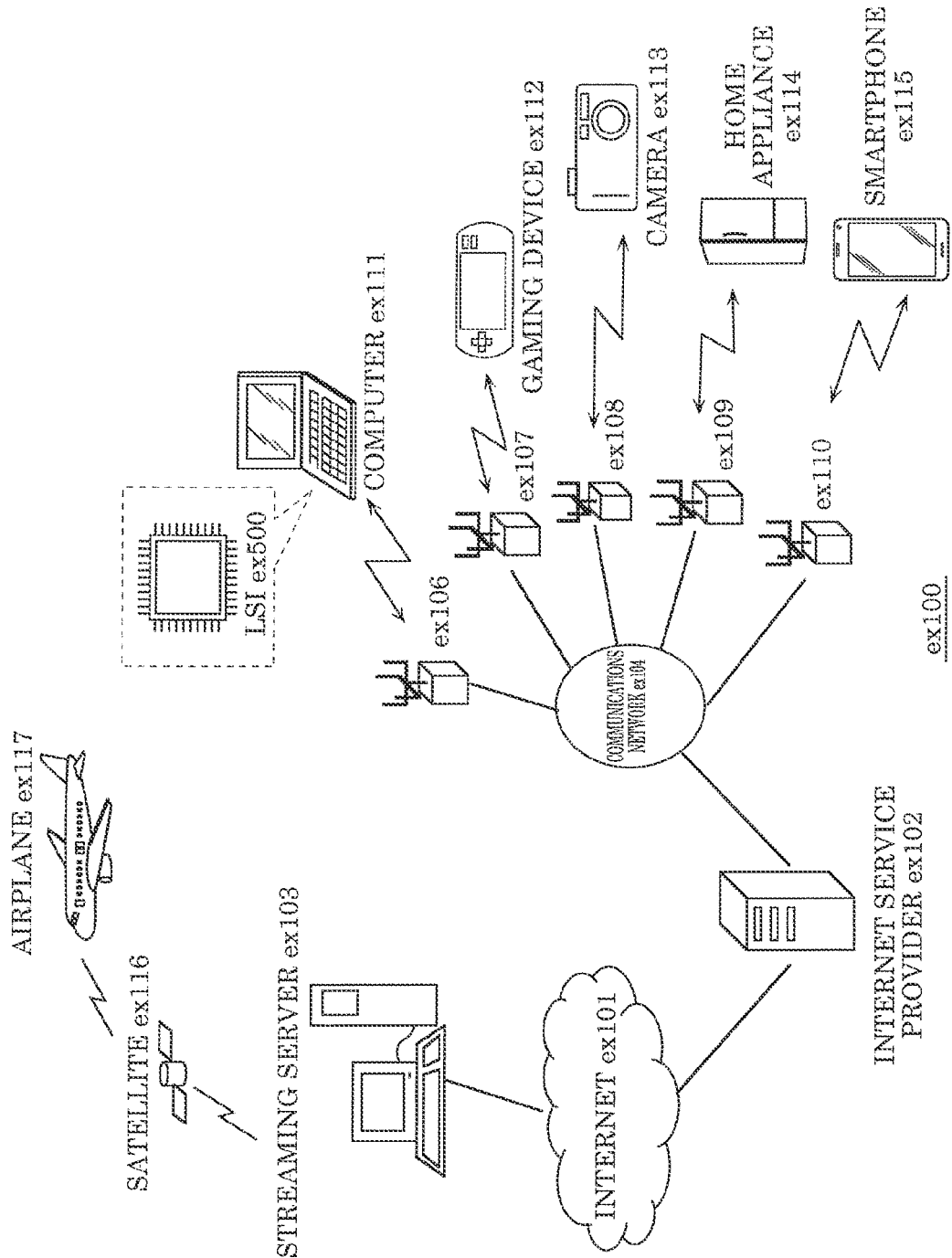
FIG. 32 illustrates an overall configuration of a content providing system for implementing a content distribution service.

FIG. 32 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110.

Content providing system ex100 may combine and connect any combination of the above elements. The devices may be directly or indirectly connected together via a telephone network or near field communication rather than via base stations ex106 through ex110, which are fixed wireless stations.

Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a determined RGB value, such as a chroma key, and generate data in which areas other than the object are set as the background. The determined RGB value may be predetermined.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 33:
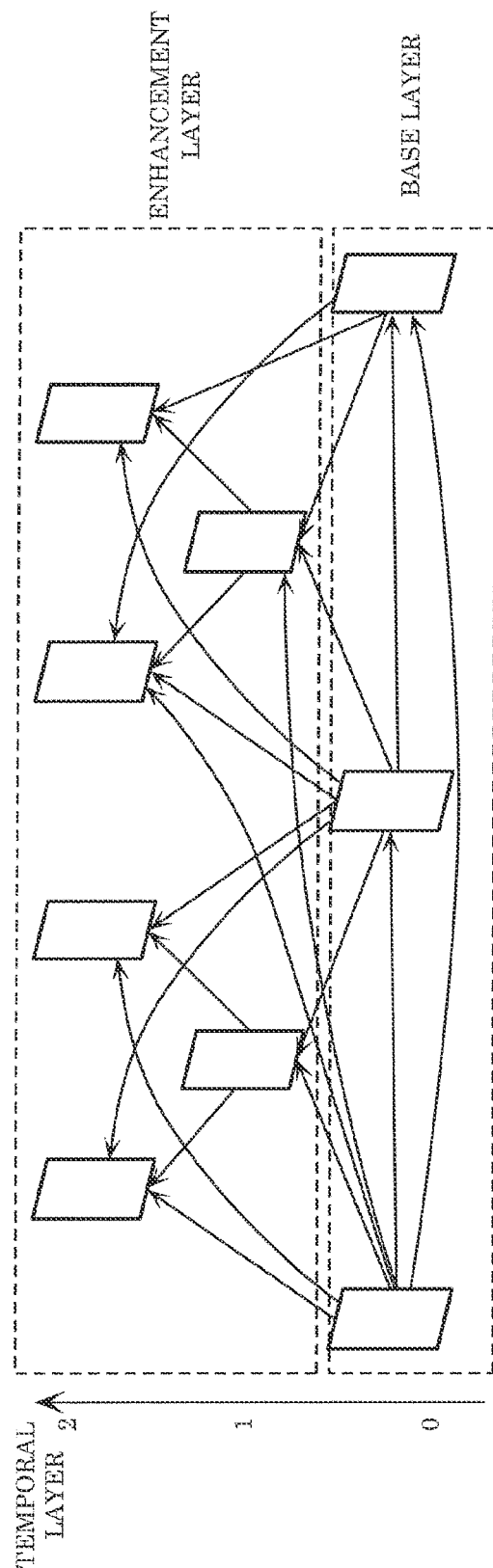
FIG. 33 illustrates one example of an encoding structure in scalable encoding.

The switching of content will be described with reference to a scalable stream, illustrated in FIG. 33, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 33. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 34:
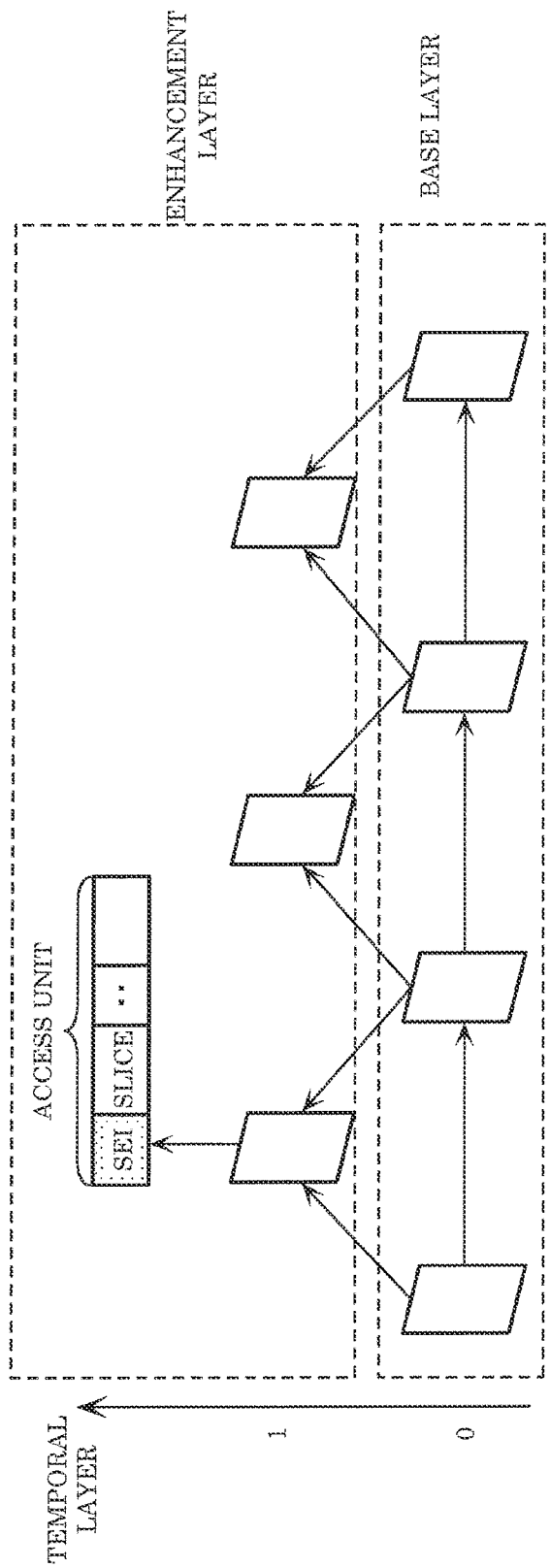
FIG. 34 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 34, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 35:
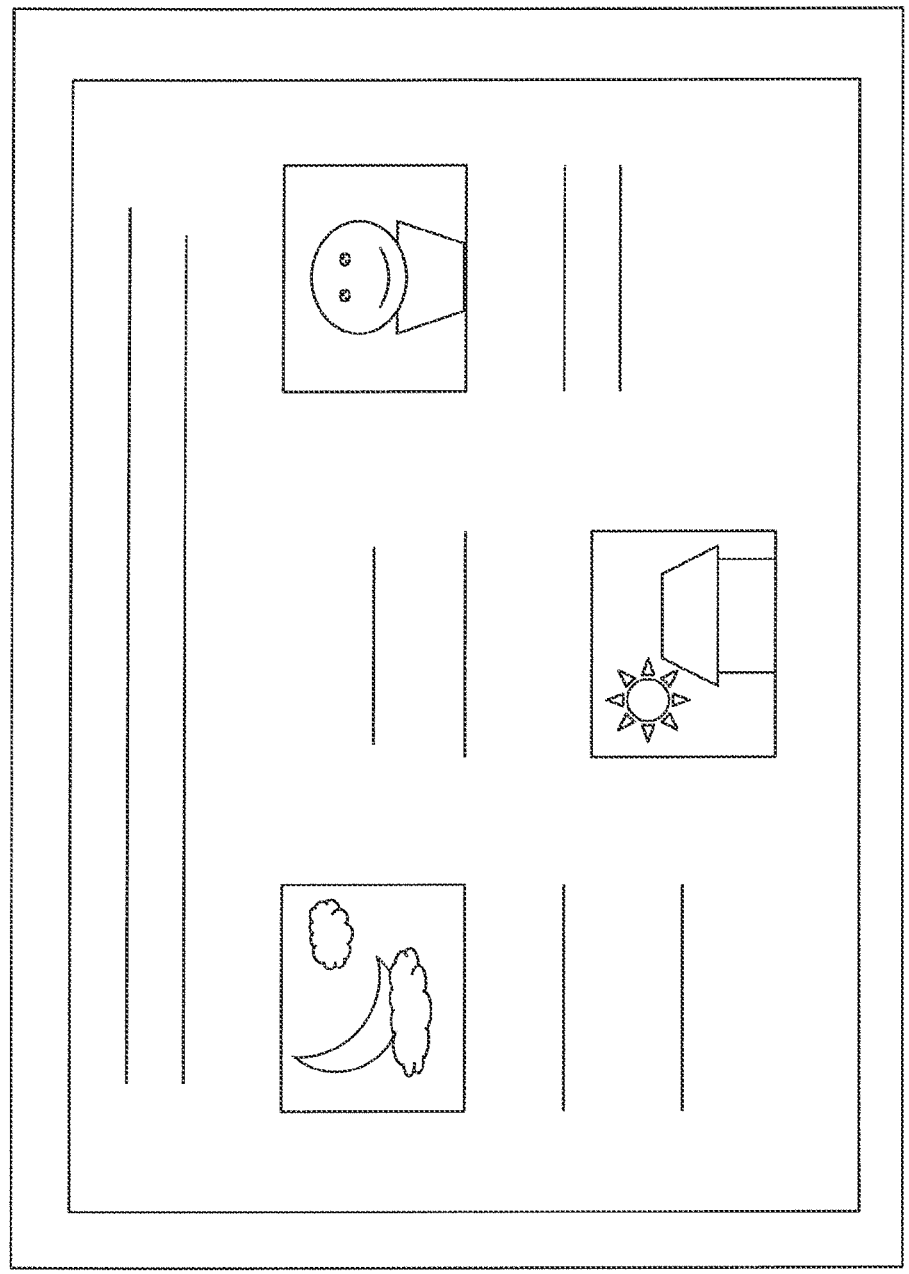
FIG. 35 illustrates an example of a display screen of a web page.
Figure 36:
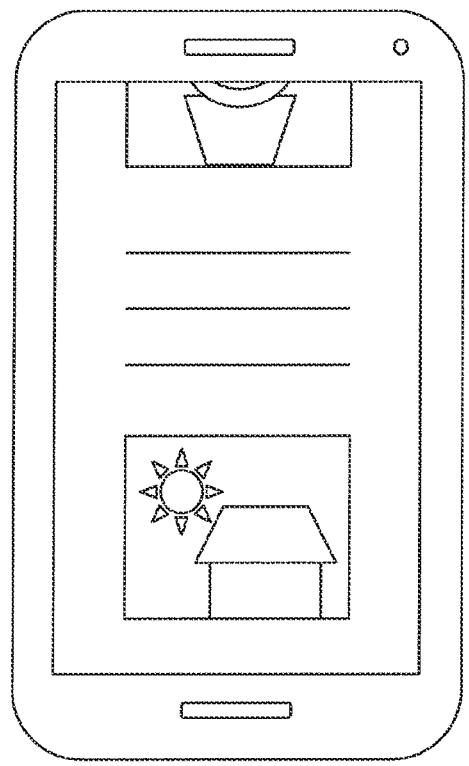
FIG. 36 illustrates an example of a display screen of a web page.

FIG. 35 illustrates an example of a display screen of a web page on, for example, computer ex111. FIG. 36 illustrates an example of a display screen of a web page on, for example, smartphone ex115. As illustrated in FIG. 35 and FIG. 36, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server-either when prompted or automatically-edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

Other Usage Examples

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 37:
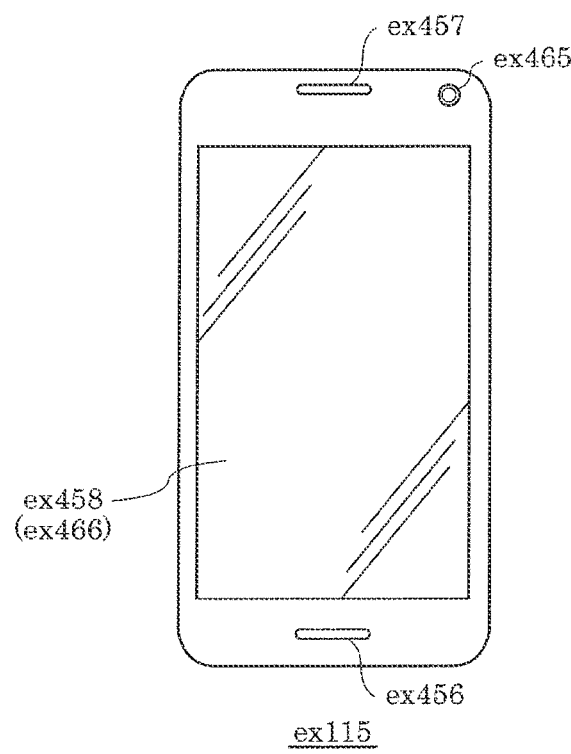
FIG. 37 illustrates one example of a smartphone.
Figure 38:
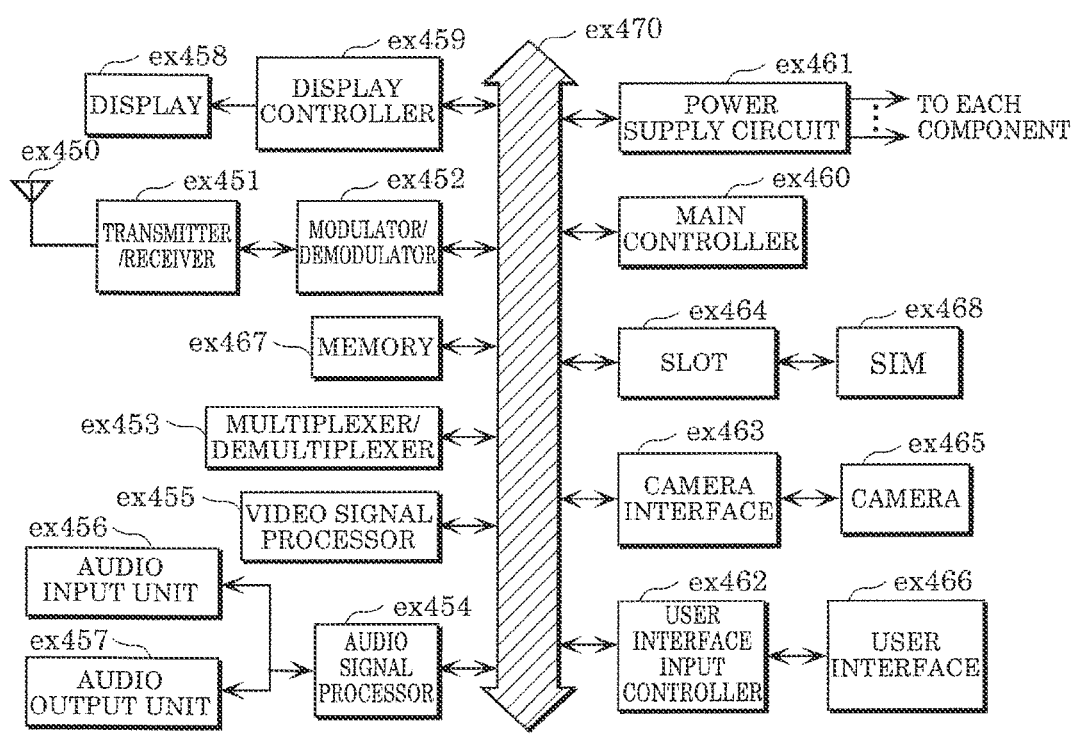
FIG. 38 is a block diagram illustrating a configuration example of a smartphone.

FIG. 37 illustrates smartphone ex115. FIG. 38 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a determined scheme, modulates and converts the data using modulator/demodulator (modulator/demodulator circuit) ex452 and transmitter/receiver ex451, and transmits the result via antenna ex450. The determined scheme may be predetermined.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to, for example, television receivers, digital video recorders, car navigation systems, mobile phones, digital cameras, digital video cameras, teleconferencing systems, electronic mirrors, etc.

What is claimed is:
1. An encoder, comprising:
circuitry; and
memory, wherein
using the memory, the circuitry, in operation, selects an encoding mode from among candidates including a decoder-side motion vector refinement (DMVR) encoding mode and a partition encoding mode,
when the DMVR encoding mode is selected, the circuitry:
obtains a first motion vector for a first image block;
derives a second motion vector from the first motion vector using motion search; and generates a prediction image for the first image block using the second motion vector; and when the partition encoding mode is selected, the circuitry:
- determines a plurality of non-rectangular partitions in a second image block;
- obtains a third motion vector for each non-rectangular partition; and
- generates a prediction image for the second image block using the third motion vector, without deriving a fourth motion vector from the third motion vector using motion search.

2. A decoder, comprising:
circuitry; and
memory, wherein
using the memory, the circuitry, in operation, determines to perform a decoding mode from among candidates including a decoder-side motion vector refinement (DMVR) decoding mode and a partition decoding mode, when the DMVR decoding mode is determined to be performed, the circuitry:
- obtains a first motion vector for a first image block;
- derives a second motion vector from the first motion vector using motion search; and
- generates a prediction image for the first image block using the second motion vector; and when the partition decoding mode is determined to be performed, the circuitry:
- determines a plurality of non-rectangular partitions in a second image block;
- obtains a third motion vector for each non-rectangular partition; and
- generates a prediction image for the second image block using the third motion vector, without deriving a fourth motion vector from the third motion vector using motion search.

3. A non-transitory computer readable medium storing a bitstream, the bitstream including information, an image block, and a plurality of motion vectors, the information indicating a selected encoding mode which is selected from among candidates including a decoder-side motion vector refinement (DMVR) encoding mode and a partition encoding mode, wherein when the information indicates that the DMVR encoding mode is selected,
- a first motion vector is obtained from the plurality of motion vectors;
- a second motion vector is derived from the first motion vector using motion search; and
- a prediction image for the image block is generated using the second motion vector; and when the information indicates that the partition encoding is selected,
- a plurality of non-rectangular partitions are determined in the image block;
- a third motion vector is obtained from the plurality of motion vectors for each of the plurality of non-rectangular partitions; and
- a prediction image for the image block is generated using the third motion vector, without deriving a fourth motion vector from the third motion vector using motion search.

* * * * *